United States Patent [19]
Shintani et al.

[11] Patent Number: 6,008,954
[45] Date of Patent: Dec. 28, 1999

[54] LENS BARREL WITH OPTICAL SYSTEM FOR PREVENTING IMAGE SHAKE

[75] Inventors: Dai Shintani, Kishiwada; Toshihiko Hirota, Sakai, both of Japan

[73] Assignee: Minolta Co., Ltd., Osaka, Japan

[21] Appl. No.: 08/921,055

[22] Filed: Aug. 29, 1997

[30] Foreign Application Priority Data

| Aug. 30, 1996 | [JP] | Japan | 8-230582 |
| Aug. 30, 1996 | [JP] | Japan | 8-230593 |
| Aug. 30, 1996 | [JP] | Japan | 8-230602 |
| Aug. 30, 1996 | [JP] | Japan | 8-230706 |

[51] Int. Cl.$^6$ .................................................. G02B 15/14
[52] U.S. Cl. ........................................... 359/704; 359/694
[58] Field of Search .................... 359/694, 695, 359/696, 697, 698, 704, 823

[56] References Cited

U.S. PATENT DOCUMENTS

| 4,123,650 | 10/1978 | Hosos et al. | 250/201 |
| 4,864,339 | 9/1989 | Gross et al. | 354/202 |
| 5,130,733 | 7/1992 | Taniguchi et al. | 354/400 |
| 5,172,276 | 12/1992 | Ueyama et al. | 359/813 |
| 5,305,040 | 4/1994 | Enomoto | 354/202 |
| 5,684,640 | 11/1997 | Tanaka et al. | 359/694 |
| 5,748,391 | 5/1998 | Tanaka et al. | 359/813 |

FOREIGN PATENT DOCUMENTS

| 2-81009 | 3/1990 | Japan. |
| 3-46642 | 2/1991 | Japan. |
| 6-339050 | 12/1994 | Japan. |
| 7-28115 | 1/1995 | Japan. |
| 7-28119 | 1/1995 | Japan. |
| 7-191361 | 7/1995 | Japan. |

*Primary Examiner*—Scott J. Sugarman
*Assistant Examiner*—Ricky Mack
*Attorney, Agent, or Firm*—Burns, Doane, Swecker & Mathis, LLP

[57] ABSTRACT

A mechanism, for optically adjusting a deviation of image forming position, which is installed in a lens barrel, for example, of a camera. The mechanism includes a first image shake preventing afocal lens and a second image shake preventing afocal lens which are supported by a first lens frame and a second lens frames, respectively. Each frame has a shaft supporting portion generally parallel to an optical axis and a gear input portion, for swinging each frame about the shaft supporting portion, opposed to the shaft supporting portion with respect to the optical axis. The first and second lens frames move in a direction generally perpendicular to each other. Each gear input portion is driven by a driving gear which is directly fixed to an output shaft of a driving motor. The motor is installed in the direction which is parallel to the optical axis.

18 Claims, 25 Drawing Sheets

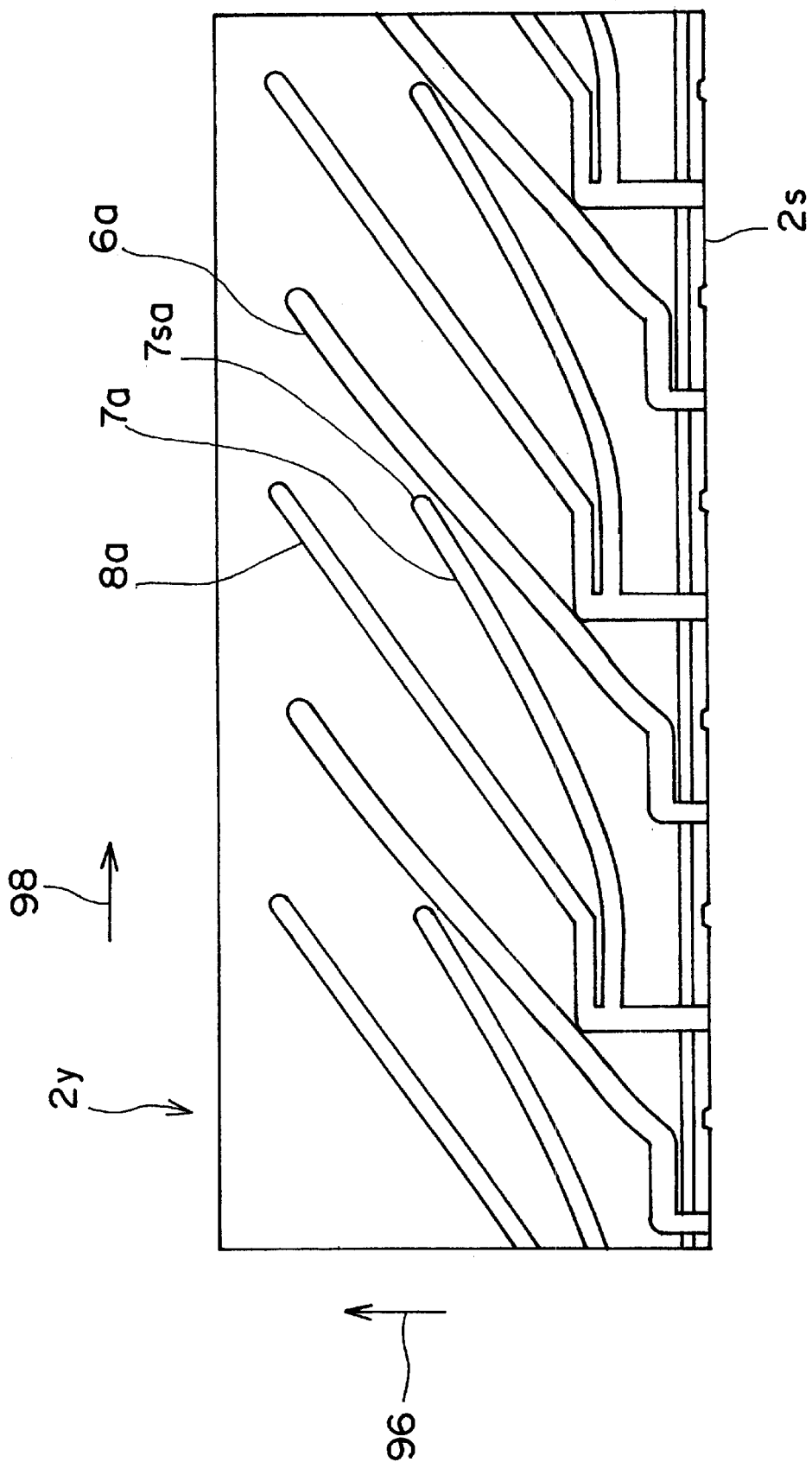

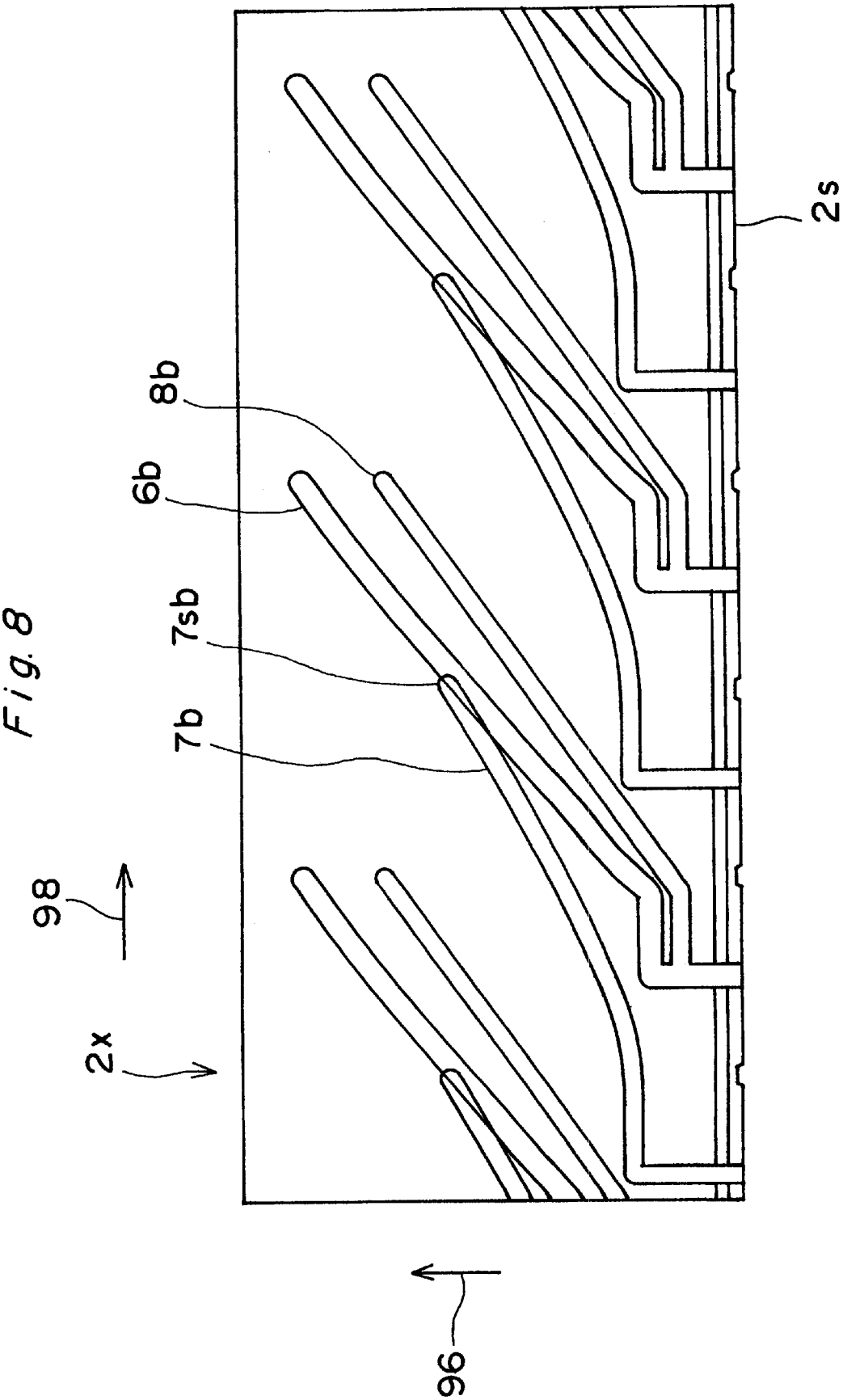

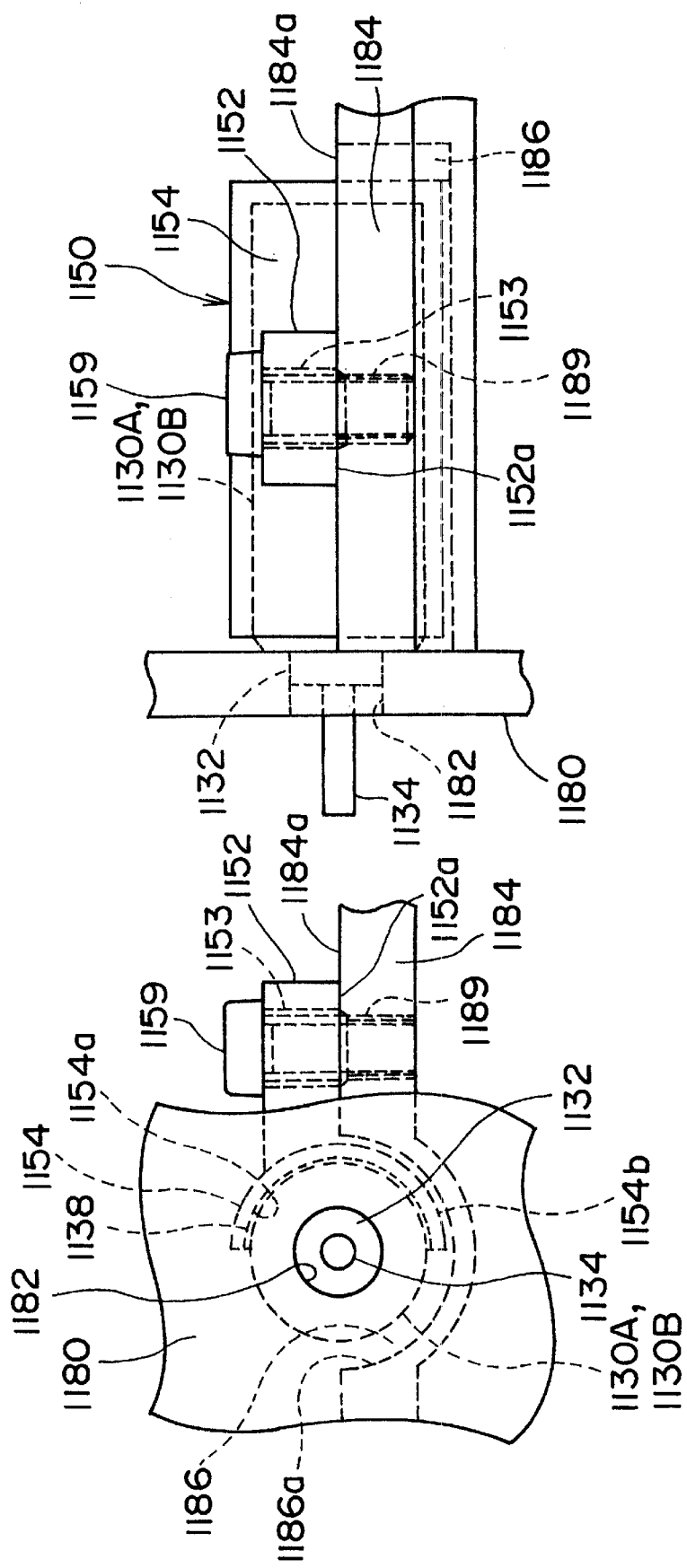

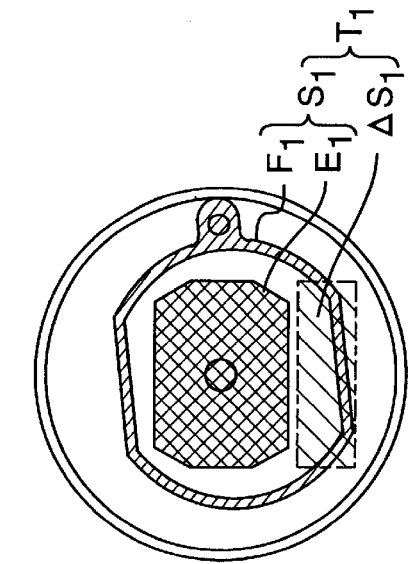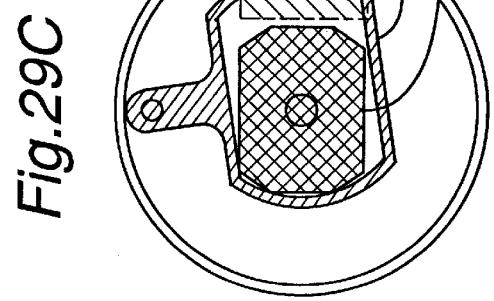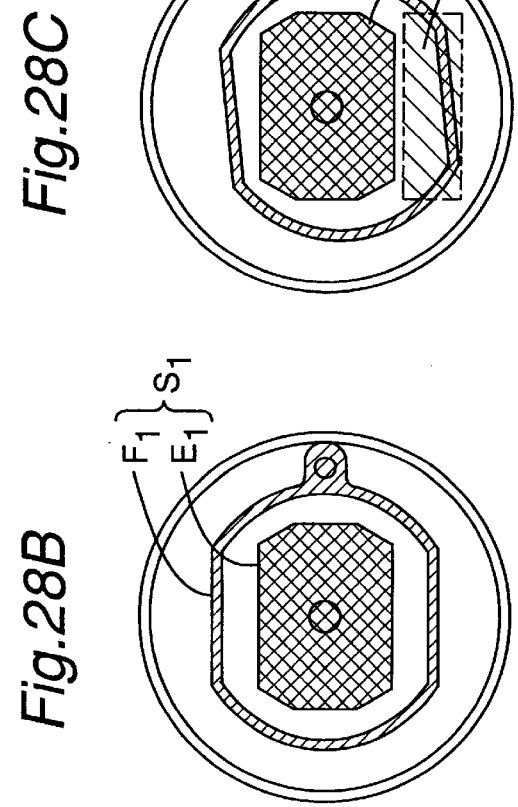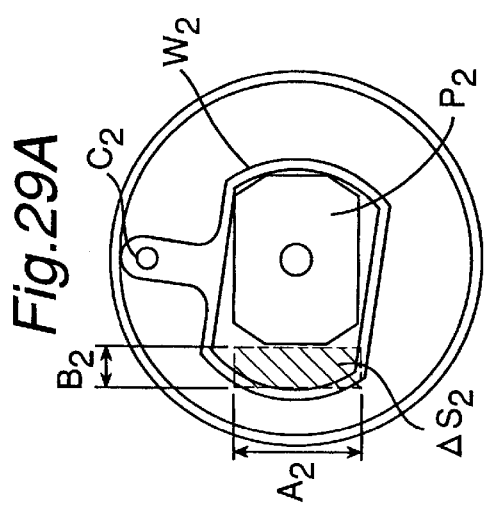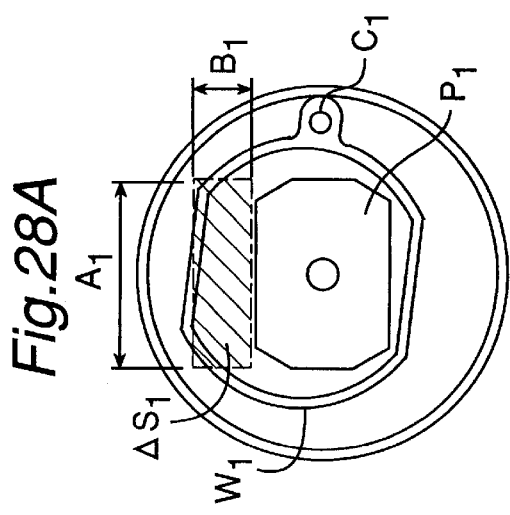

LENS BARREL WITH OPTICAL SYSTEM FOR PREVENTING IMAGE SHAKE

BACKGROUND OF THE INVENTION

1. Field of the Invention

The present invention relates to a lens barrel used in a camera for example, and more particularly relates to the lens barrel with an optical system for preventing an image shake, or for correcting or compensating a deviation of an image-forming position, which is caused by a camera shaking or camera movement.

2. Description of the Related Arts

When a camera body is moved or shaken at time of photographing, an image-forming position or a position of object image, onto a photosensitive surface, is deviated out of position. In order to prevent such a deviation of the image-forming position, there have been proposed various types of photographic lenses provided with an optical system for correcting the deviation caused by such a shaking or movement of the camera body.

For example, Japanese Laid-Open Patent Publication No. 7-191361 discloses a photographing lens 1, as shown in FIG. 27, which includes a main photographic optical system 5, and an afocal lens group 3 consisting of a pair of lenses 3a and 3b, in front of the main photographic optical system 5, that function as an image shake preventing optical system 3. Generally, the afocal lens group points to a lens system which is constituted of at least two lenses each of which has a specified optical characteristic (i.e. a characteristic by which a light is converged or diverged, etc.), and which has no specific optical characteristic as a whole. According to the mechanism of the Publication, one lens 3a of the shake preventing optical system 3 is moved at a right angle with respect to an optical axis S and in a vertical direction V by a predetermined amount, and another lens 3b thereof is moved at a right angle with respect to the optical axis S and in a horizontal direction H by a predetermined amount, so as to correct the deviation of an image forming position relative to an optical system of the camera.

However, each of the driving mechanisms 4a and 4b requires a great driving force, is slow in its responding speed and has a complicated construction, because the lenses 3a and 3b are moved in parallel with each other by means of screws in the driving mechanisms 4a and 4b for driving the pair of lenses 3a and 3b of the image shake preventing optical system 3.

Also, the conventional mechanism requires a wide space approximately rectangular for accommodating the pair of driving mechanisms 4a and 4b therein, which in turn requires the lens barrel with a greater outer diameter.

In particular, in case that the shake preventing optical system 3 is positioned in front of the main photographing optical system 5, the outer diameters of the lenses 3a and 3b in the image shake preventing optical system 3 need to be greater than that of the lens in the main photographing optical system 5 in order to receive a bundle of rays which diverge. Thus, there is a constant growing demand for miniaturizing the driving mechanisms 4a and 4b as much as possible.

Also, according to the conventional mechanism, a guide bar and a driving motor are installed outside the supporting frames of the lenses 3a and 3b in the radial direction thereof. Thus, a wide space is required to accommodate the driving mechanisms 4a and 4b for moving the lenses 3a and 3b of the image shake preventing optical system 3 in parallel with each other, which in turn necessitates the lens barrel to be large in its outer diameter.

Also, according to the conventional mechanism, the lens supporting means which supports the lenses 3a and 3b in the shake preventing optical system 3 so that the lenses 3a and 3b are movable in parallel with each other, includes an engaging portion which engages a guide rod extending in a tangential direction from the lens frame of the lens 3a or 3b. Thus, a wide space is required to accommodate the guide rod and the engaging portion therein, which in turn causes a problem in which the outer diameter of the lens barrel can not help but be constructed larger.

Meanwhile, Japanese Laid-Open Patent Publication No. 7-28115 discloses a lens barrel, as shown in FIG. 30, in which a pair of image shake preventing lenses 1 are moved in two directions perpendicular to the optical axis thereof and moved in parallel with each other. According to the mechanism, a pair of screw shafts 4x and 4y which are perpendicular to each other are rotated to move themselves back and forth, respectively, so that the lens frames 3 of the image shake preventing lenses 1 are moved in parallel with each other through the movable members 3x and 3y. In the mechanism, a pair of springs 5x and 5y are mounted to bias the pair of screw shafts 4x and 4y so that a thrust shake of the screw shafts 4x and 4y, and a backlash between the engaging parts thereof are removed, and so that the movement of the screw shafts 4x and 4y is transmitted to the lens frame 3 for the image shake preventing lens 1 reliably.

However, because there are mounted the movable members 3x and 3y, the screw shafts 4x and 4y, and the urging springs 5x and 5y around the image shake preventing lenses 1, there arises a problem in which the outer diameter of the lens barrel is constructed necessarily large.

SUMMARY OF THE INVENTION

Therefore, it is an object of the present invention to provide a compact lens barrel in which a lens of an image shake preventing optical system is driven by means other than means for the parallel movement thereof, and in which the lens driving mechanism is simple in its construction.

It is another object of the present invention to provide a compact and simple lens barrel in which a lens of an image shake preventing optical system is driven by means other than means for the parallel movement thereof, and in which the lens driving mechanism is installed at a location as radially inward as possible.

It is still another object of the present invention to provide a compact and simple lens barrel in which a lens of an image shake preventing optical system is driven by means other than means for the parallel movement thereof, and in which the lens supporting member is as small as possible.

It is still another object of the present invention to provide a compact and simple lens barrel in which a lens of an image shake preventing optical system is driven by means other than means for the parallel movement thereof, without a shaking or backlash.

In accomplishing these and other objects of the present invention, there is provided a lens barrel comprising: a first lens group; a second lens group; a first member which supports the first lens group inside the lens barrel; a second member which supports the second lens group inside the lens barrel; a first axis which is provided at a first position inside a periphery of the lens barrel and which rotatably supports the first member, wherein the first axis is generally parallel with an optical axis in a first plane that includes the optical axis; a second axis which is provided at a second position, different from the first position, inside the periphery of the lens barrel and which rotatably supports the second member, wherein the second axis is generally parallel with the optical axis in a second plane, perpendicular to the first plane, that includes the optical axis; a first drive mechanism which is provided inside the periphery of the lens barrel, wherein the first drive mechanism is provided generally opposite the first axis relative to the optical axis; a second drive mechanism which is provided inside the periphery of the lens barrel, wherein the second drive mechanism is provided generally opposite the second axis relative to the optical axis; a first input mechanism which is driven by the first drive mechanism so that the first lens group is rotated about the first axis via the first member; and a second input mechanism which is driven by the second drive mechanism so that the second lens group is rotated about the second axis via the second member.

In the construction, the first lens group and the second lens group can constitute an afocal lens system.

In the construction, the first and second lens supporting means, or the first and second members, hold the first and second lenses, respectively. Typically, the first and second lens supporting means are constructed to surround the entire periphery of the first and second lenses, respectively. But it is possible to construct the first and second lens supporting means in such a manner that the first and second lens supporting means surround a part of the periphery of the first and second lenses, respectively, or sandwich a part of the periphery of the first and second lenses, respectively, at the front and the rear thereof along the optical axis. Typically, the first and second lens supporting means are constructed by separate members, respectively. Alternatively, the first lens and the first member may be formed integrally of plastic material, and the second lens and the second member may be formed integrally of plastic material. The first and second lens supporting means are pivotal in planes perpendicular to the optical axis, and the first and second lens supporting means are supported reliably in a direction perpendicular to the optical axis by the first and second supporting shafts (i.e. first and second axes) which are respectively provided in parallel with the optical axis.

This construction allows the first and second lenses to be supported in the direction perpendicular to the optical axis, and the construction prevents the first and second lenses from being fluctuated in the inclination thereof with respect to the optical axis and in the positions thereof in the optical axis. Accordingly, with the construction, defocussing is prevented from occurring.

Typically, the first and second driving input means are constructed by installing separate mechanisms or members, respectively. Alternatively, the first and second driving input means may be integral with the first and second lenses, and they may be formed of plastic material, respectively. When the first driving means (i.e. first drive mechanism) drives the first driving input means, the first lens pivots on the first supporting shaft (i.e. first axis) in a direction approximately perpendicular to the line connecting the first supporting shaft and the first driving input means.

Similarly, when the second driving means drives the second driving input means, the second lens pivots on the second supporting shaft in a direction approximately perpendicular to the line connecting the second supporting shaft and the second driving input means.

When the lens barrel is viewed along the optical axis, the locus of the center of each of the first and second lenses forms a circular arc around each of the first and second supporting shafts, respectively. Because the line connecting the first supporting shaft and the first driving input means with each other is perpendicular or approximately perpendicular to the line connecting the second supporting shaft and the second driving input means with each other, the circular arcs are approximately perpendicular to each other. Thus, the construction corrects or compensates the image-forming position in two dimensions when a camera movement occurs.

The above construction allows the lens-supporting mechanism to be constructed smaller and simpler than the conventional one. In the construction, the supporting shaft and the driving means are approximately symmetrical with respect to the optical axis, in which the distance therebetween is greater. Therefore, even a small driving force makes the rotational moment great. Thus, the driving means is capable of pivoting the first and second lenses at a small force, and thus the driving means itself can be allowed to be designed compact. As apparent from the above description, the construction allows the first and second lens supporting means and the first and second driving means to be compact, and does not require a large space around the first and second lenses. Thus, a compact lens barrel can be provided.

In other words, the present invention provides a lens barrel compact and simple in its construction in which it is possible to drive the image shake preventing lenses not by moving them in parallel with each other, but by a different system.

It is possible to mount the lens supporting means and the driving input means on each of the first and second lenses, separately.

It is preferable that the first member and the first input member are constructed as a first lens supporting member, and wherein the second member and the second input member are constructed as a second lens supporting member.

In the construction, the first and second lens supporting members are constituted as the first and second lens supporting means. That is, the first and second lens supporting members hold the first and second lenses, respectively, and the members are supported by the first and second supporting shafts or axes, respectively. The first and second driving input means which are driven by the first and second driving means, respectively, are formed on the first and second lens supporting members, respectively. This construction allows the lens barrel to be composed of a small number of parts, thus simplifying the construction of the lens barrel.

It is preferable that the first drive mechanism comprises a first drive motor which is provided in a direction generally parallel to the optical axis, wherein the second drive mechanism comprises a second drive motor which is provided in the direction generally parallel to the optical axis, wherein the first input mechanism comprises a first input gear, wherein the first drive mechanism comprises a first drive gear that engages the first input gear in which the first drive gear is directly fixed to an output shaft of the first drive motor, wherein the second input mechanism comprises a second input gear, and wherein the second drive mechanism comprises a second drive gear that engages the second input gear in which the second drive gear is directly fixed to an output shaft of the second drive motor.

In the above construction, the input gear can be formed on the circular frame of each of the first and second lenses. The input gear engages the driving gear fixed to the output shaft of the driving motor. As the input gear and the driving gear, a spur gear, a helical gear, a double helical gear or a bevel gear can be used. It is possible to use an external gear as the input gear and the driving gear, or to use a combination of the external gear and an internal gear as the input gear and the driving gear. Because the driving motor is parallel with the optical axis, the cylindrical lens barrel is allowed to have a small diameter, namely, to be compact. Further, because the rotation of the driving motor is transmitted directly to the driving gear without the intermediary of the reduction gear, the backlash of the reduction gear does not occur. Thus, there is no delay in the transmission of the rotation of the driving motor, and the control of the position of the first and second lenses of the image shake preventing optical system can be accomplished accurately.

In case that the first lens group and the second lens group constitute an afocal lens system, the positioning of the afocal lens system, which is provided in the shake preventing optical system, in front of the main photographic optical system, allows the main photographic optical system to be designed without considering the influence of the image shake preventing optical system, and it allows the afocal lens(es) of the image shake preventing the optical system from being moved by a large amount to correct an image-forming position, thus accomplishing a favorable control of the lens in the image shake preventing optical system. But the diameter of the afocal lens therein is required to be constructed large because a bundle of rays diverges widely in front of the main photographic optical system inside the lens barrel.

It is preferable that the first and second lens groups are provided on a side of an object to be photographed with respect to a main photographic optical system inside the lens barrel, and wherein at least a part of the drive motor is provided near the main photographic optical system.

In the construction, the outer diameter of the driving motor positioned in parallel with the optical axis is reduced, and the driving motor is elongated axially to maintain a desired driving torque. This construction allows the outer diameter of the lens barrel to be constructed small, even though the outer diameter of the afocal lens of the image shake preventing optical system is large. The driving motor is elongated toward the main photographic optical system, i.e., the driving motor is elongated rearward and a part of the entire driving motor is entirely positioned in the periphery of the main photographic optical system in the radial direction thereof. This construction allows the outer diameter of the lens barrel to be small without elongating the lens barrel. That is, the lens barrel can be allowed to be constructed compact, even though the image shake preventing optical system is positioned ahead of the main photographic optical system.

By the way, the afocal lens group including the first and second lenses may comprise the afocal lens(es) only, or may comprise a combination of the afocal lens and a lens belonging to the main photographic optical system.

The first and second lenses in the optical direction are positioned as desired. That is, they may be forward from the main photographic optical system, rearward therefrom or somewhere between the front and rear of the main photographic optical system. The first and second lens supporting means support the first and second lenses, respectively. When the driving gear is rotated by the rotation of the driving motor, the driving gear engages the input gear. As a result, the first and second lenses supported by the first and second lens supporting means, respectively, pivot on the first and second supporting shafts in each of planes perpendicular to the optical axis. Because the movement locus of the center of the first lens is approximately perpendicular to that of the center of the second lens when the lens barrel is viewed along the optical axis, the image-forming position can be corrected in two dimension directions when a camera movement occurs.

Therefore, the present invention provides a compact and simple lens barrel in its construction in which it is possible to drive the image shake preventing lenses not by moving them in parallel with each other, but by a different system to allow the lens driving mechanism to be simple.

Further, there is no delay in transmission of rotation of the driving motor because no reduction gear is used, and the control of the position of the first and second lenses of the image shake preventing optical system can be accomplished accurately.

In accomplishing the above objects of the present invention, there is also provided a lens barrel comprising: a first lens for correcting an image-forming position; a second lens for correcting the image-forming position; a lens supporting member which supports the first lens; a second lens supporting member which supports the second lens; a first drive pinion which is provided at a location around the first lens and which rotates the first lens supporting member; and a second drive pinion which is provided at a location around the second lens and which rotates the second lens supporting member, wherein the first lens supporting member comprises: a first input gear which engages the first drive pinion, and a first supporting axis which rotatably supports the first lens supporting member in a first plane perpendicular to an optical axis, wherein the second lens supporting member comprises: a second input gear which engages the second drive pinion, and a second supporting axis which rotatably supports the second lens supporting member in a second plane, perpendicular to the first plane, perpendicular to the optical axis, wherein one of the first input gear and the second input gear is an internal gear, and the other thereof is an external gear.

In the construction, the image shake preventing first and second lenses (i.e. the first and second lenses for correcting or compensating an image-forming position), may comprise afocal lenses only which are independent of a main photographing lens group, or may use a combination of the afocal lens(es) and a photographing lens (or lenses) in the main photographing lens group which has a particular optical characteristic. The image shake preventing first and second lenses can be located at desired positions along the optical axis. For example, the first and second lenses may be located in the front and rear of the photographic optical system, or may be located at any positions between the front and rear of the photographic optical system. The first and second lens supporting members hold the first and second lenses, respectively. Typically, the first and second lens supporting members comprise circular frames surrounding the entire periphery of the first and second lenses. Alternatively, for example, the first and second lens supporting members may be so constructed that they surround a portion of the periphery of the first and second lenses or they sandwich a part of the first and second lenses in the front and rear thereof along the optical axis. The supporting portion of each of the first and second lens supporting members is supported by a supporting shaft and is pivotal in planes perpendicular to the optical axis in which the planes are perpendicular to each other. When the input gear is driven by the drive pinion, each of the first and second lens supporting members pivots on the supporting portion (i.e. supporting axis) in the plane perpendicular to the optical axis. Consequently, the first and second lenses move along a locus of a circular arc in the direction approximately perpendicular to each other when the lens barrel is viewed along the optical axis, thus correcting the image-forming position in two dimensions when a camera movement occurs.

In the construction, the size of each of the first and second lens supporting members may be varied according to various factors such as the diameter of the effective luminous flux range and the driving directions of the lens supporting members. Therefore, normally, an internal gear is used as the input gear of the larger lens supporting member, whereas an external gear is used as the input gear of the smaller lens supporting member. This construction allows the formation of a possible smallest donut-shaped space having the center at the optical axis and accommodating the driving pinions spaced with an equal distance from the optical axis. Because the component parts such as a rotary cylinder cannot be accommodated in the donut-shaped space, the lens barrel is allowed to be small by making the donut-shaped space as small as possible. The donut-shaped space around the lens supporting member whose input gear consists of the external gear can house its driving device thereof and the position detection device thereof. Thus, the space can be effectively utilized.

Accordingly, the present invention provides a lens barrel in which image shake preventing lenses are driven not by moving them in parallel with each other, but by a different system, and in which a driving mechanism is located at a position as radially inward as possible to allow the lens barrel to be compact and have a simple construction.

In the construction, it is determined by various factors whether the external gear is used as the input gear of the first lens supporting member and the internal gear is used as the input gear of the second lens supporting member, or the internal gear is used as the input gear of the first lens supporting member and the external gear is used as the input gear of the second lens supporting member. Generally, as described above, when the input gear of the larger lens supporting member consists of the internal gear, the image shake preventing lens barrel can be allowed to be compact.

It is preferable that the input gear provided on one having a largest effective light pass radius, of the first lens supporting member and the second lens supporting member is the internal gear.

In the construction, the first or second lens supporting member having the larger effective path diameter supports the larger lens and thus the lens supporting member is large. In this case, the above construction allows the image shake preventing lens barrel (i.e. the lens barrel with the image shake preventing optical system) to be compact and small.

It is also preferable that the input gear provided on one W1 which is driven in a direction in which a short side of an aperture of the lens supporting member extends, of the first lens supporting member W1 and the second lens supporting member W2, is the internal gear.

The construction is explained below with reference to FIGS. 28A, 28B, 28C, 29A, 29B, and 29C.

Normally, an aperture is rectangular. Sectional surfaces P1 and P2 of an effective optical path in a direction perpendicular to the optical axis at the position of each of the first lens supporting member W1 and the second lens supporting member W2 are approximately similar to the aperture which is rectangular. In outline, as shown in FIGS. 28A, 28B, and 28C, it is necessary to make the entire area T1 of the first lens supporting member W1 pivoting the lens on a supporting portion C1 in the direction in which the shorter side of the aperture extends larger by an area $\Delta S1$ corresponding to the product of the length A1 of the longer side of the sectional surface P1 of the effective optical path in the direction perpendicular to the optical axis and a movement distance B1 than the sum S1 of the area E1 of the sectional surface P1 of the effective optical path in the direction perpendicular to the optical axis and the area F1 of the frame of the first lens supporting member W1.

Meanwhile, as shown in FIGS. 29A, 29B, and 29C, it is necessary to make the entire area T2 of the second lens supporting member W2 pivoting the lens on a supporting portion C2 in the direction approximately perpendicular to the shorter side of the aperture, namely, in the direction in which the longer side of the aperture extends larger by an area $\Delta S2$ corresponding to the product of the length A2 of the shorter side of the sectional surface P2 of the effective optical path in the direction perpendicular to the optical axis and a movement distance B2 than the sum S2 of the area E2 of the sectional surface P2 of the effective optical path in the direction perpendicular to the optical axis and the area F2 of the frame of the second lens supporting member W2.

From the above, when the area E1 of the sectional surface P1 of the effective optical path, in the direction perpendicular to the optical axis, of the first lens supporting member W1 of the first lens supporting member W1 pivoting the lens in the direction in which the shorter side of the aperture extends is greater than the area E2 of the sectional surface P2 of the effective optical path, in the direction perpendicular to the optical axis, of the second lens supporting member W2 pivoting the lens on the C1 in the direction in which the longer side of the aperture extends, the following equations are obtained:

$$S1>S2 \text{ and } \Delta S1>\Delta S2, S1+\Delta S1>S2+\Delta S2$$

Accordingly, the first lens supporting member W1 whose entire area T1 is approximately $S1+\Delta S1$ is greater than the second lens supporting member W2 whose entire area T2 is approximately $S2+\Delta S2$.

Even when the area E1 of the sectional surface P1 of the effective optical path, in the direction perpendicular to the optical axis, of the first lens supporting member W1 is smaller than or equal to the area E2 of the sectional surface P2 of the effective optical path, in the direction perpendicular to the optical axis, of the second lens supporting member W2, there is a case in which the first lens supporting member W1 whose entire area T1 is approximately $S1+\Delta S1$ is greater than the second lens supporting member W2 whose entire area T2 is approximately $S2+\Delta S2$. For example, when the length A1 of the longer side of the sectional surface P1 of the effective optical path, of the first lens supporting member W1, in the direction perpendicular to the optical axis is greater than the length A2 of the shorter side of the sectional surface P2 of the effective optical path, of the second lens supporting member W2, in the direction perpendicular to the optical axis, the movement distances B1 and B2 are equal to each other. Consequently, $S1>\Delta S2$. Therefore, even when $S1 \leq S2$, an equation of $S1+\Delta S1>S2+\Delta S2$ is established. That is, the first lens supporting member W1 pivoting the lens in the direction in which the shorter side of the aperture extends is greater than the second lens supporting member W2.

As described above, when the first lens supporting member W1 pivoting the lens in the direction in which the shorter side of the aperture extends is greater than the second lens supporting member W2 or in other case, an internal gear is used as the input gear of the first lens supporting member W1 to allow the image shake preventing lens barrel to be compact.

In accomplishing the above objects, there is also provided lens barrel comprising: a first supporting axis which is provided at a position inside a periphery of the lens barrel, wherein the first supporting axis is parallel to an optical axis thereof; a second supporting axis which is provided at a position inside the periphery of the lens barrel, wherein the second supporting axis is parallel to the optical axis thereof; a first lens supporting member which holds a first lens for correcting an image-forming position, is rotatably supported by the first supporting axis with the first lens supporting member being perpendicular to the first supporting axis, and has a first engaging input part; a second lens supporting member which holds a second lens for correcting the image-forming position, is rotatably supported by the second supporting axis with the second lens supporting member being perpendicular to the second supporting axis, and has a second engaging input part; a first engaging drive part which engages the first engaging input part so that the first lens supporting member is rotated about the first supporting axis; a second engaging drive part which engages the second engaging input part so that the second lens supporting member is rotated about the second supporting axis; a first rotation biasing member which is provided on the first supporting axis, and which biases the first lens supporting member in a predetermined rotational direction; and a second rotation biasing member which is provided on the second supporting axis, and which biases the second lens supporting member in a predetermined rotational direction.

In the construction, when each of the lens supporting means (i.e. lens supporting member) which is supported by each of the supporting shafts or axes is driven by the engaging input portion, the lens supporting means pivots on each of the supporting shafts. This construction allows the image shake preventing lenses for correcting an image-forming position to move in the direction perpendicular to the optical axis in a shape or locus of a circular arc. Thus, the correction or compensation of the image-forming position or deviation thereof is realized.

According to the construction, because each of the lens supporting means is always urged in one direction by each of the pivoting urging means (for example, by each torsion spring), the driving force of the engagement driving means (i.e. engaging drive part) is transmitted to the lens supporting means without delay. That is, because the pivoting urging means urges the lens supporting means in one direction, the engaging tooth surface of the engagement driving means and that of the engagement input portion (i.e. engaging input part) of the lens supporting means contact each other at the same side. Thus, even when the driving direction of the engagement driving means is reversed, there is no delay in the transmission of the engagement driving means to the lens supporting means. That is, the pivoting urging means prevents backlash in the engagement or screwing between the engagement driving means and the engagement input portion of the lens supporting means.

Owing to the urging force of the pivoting urging means, engaging surfaces inside the engagement driving means always engage therewith on the same side. Therefore, when the driving direction of the engagement driving means is reversed, there is no delay in the transmission of the engagement driving means to the lens supporting means. That is, the pivoting urging means prevents backlash in engagements or screwing inside the engagement driving means. For example, when the engagement driving means includes a worm gear and a screw shaft, the pivoting urging means prevents a thrust backlash of the worm gear and the screw shaft in the axial direction thereof. The pivoting urging means is installed on the supporting shaft and the entirety or the greater part thereof can be located radially inwardly from the lens supporting means. Thus, the lens barrel can be allowed to have a smaller and simpler construction than the conventional lens barrel in which the pivoting urging means is located radially outwardly from the lens supporting means.

Thus, the present invention provides a lens barrel in which image shake preventing lenses are driven not by moving them in parallel with each other, but by a different system without therefrom shaking of the image shake preventing lenses to allow the lens barrel to be compact and have a simple construction.

When the position of the image shake preventing lens is dislocated or deviated in the optical direction, an image-forming position moves in the optical direction, too, thus defocussing occurring.

It is preferable that there is further provided: a first axial biasing member which is provided on the first supporting axis, and which biases the first lens supporting member in a direction of the optical axis, so that the first lens supporting member is contacted with a stopper that is provided on a predetermined position of a body of the lens barrel; and a second axial biasing member which is provided on the second supporting axis, and which biases the second lens supporting member in the direction of the optical axis, so that the second lens supporting member is contacted with a stopper that is provided on a predetermined position of the body of the lens barrel.

In the construction, because the axial direction urging means (i.e. axial biasing member) brings the lens supporting means into contact with the stopper by urging the lens supporting means thereto, the lens supporting means pivots in a predetermined level of plane which is separated from stopper as its standard. Therefore, with the construction, the lens supporting means is prevented from being shaken axially, i.e., the lens supporting means is prevented from being dislocated along the optical direction. In other words, the defocussing is surely prevented from occurring. Because the axial direction urging means is installed on the supporting shaft, the lens barrel is allowed to be constructed compact and simple in its construction.

It is preferable that the rotation biasing member and the axial biasing member are comprised of a torsion spring, wherein the torsion spring has a coil part that is generally cylindrical in shape and is able to be compressed, and has a pair of hooks that project radially outwardly from both ends thereof, wherein the coil part of the torsion spring is engaged around the supporting axis with the coil part thereof being compressed, so that the lens supporting member is biased in the direction of the optical axis, and so that the lens supporting member is contacted with the stopper, wherein one of the pair of hooks of the torsion spring with a strain energy being stored therein engages the lens supporting member, and the other of the pair thereof engages the body of the lens barrel, so as to bias the lens supporting member in the predetermined rotational direction relative to the body of the lens barrel.

According to the construction, the coil part of the torsion spring biases the lens supporting member in the direction of the optical axis so that the lens supporting member is contacted with the stopper of the body of the lens barrel. In other words, the torsion spring or coil serves as axial direction urging means. The pair of hooks of the torsion coil spring serves as the pivoting urging means. The pair thereof urge the lens supporting means pivotally in one direction relative to the lens barrel.

In other words, it is possible to construct the pivoting urging means and the axial direction urging means conveniently by using the torsion coil spring.

In accomplishing the above objects of the present invention, there is also provided a lens barrel comprising: at least two lens groups; and at least two lens-supporting members for holding the at least two lens groups, wherein each of the lens-supporting members is rotationally supported by a different point inside a periphery of the lens barrel in which each of the lens-supporting members rotates in a different plane which is perpendicular to an optical axis of the lens barrel, and wherein the lens supporting member, having the lens group which has a smallest luminous flux range, of the at least two lens-supporting members, is rotated to move along a general direction in which a long side of the luminous flux range extends.

In the construction, the at least two lens groups can constitute an afocal lens system.

In the construction, each lens group may consist of one lens. For example, if there are provided a first lens supporting member and a second lens supporting member (i.e. a first member and a second member) inside the lens barrel, each of the first and second members has a circular lens frame surrounding the entire periphery of each lens.

Alternatively, it is possible to construct each member so that it surrounds a part of the periphery of the lens or it sandwiches a part of the periphery of the lens at the front and rear thereof in the optical axis-extending direction.

At least two of the lens supporting means are pivotal in planes perpendicular to the optical axis. Because the lens supporting means holding one lens group having the smallest effective luminous flux range is pivotally driven along the longer side of the effective luminous flux range, namely, the longer side of the aperture, the lens group supported by the lens supporting means moves in the shape, or locus, of a circular arc in the direction of the longer side of the aperture. The remaining lens supporting means is/are pivotal in plane(s) perpendicular to the optical axis, with the lens group(s) supported thereby moving in locus of a circular arc in directions different from the direction in which the lens group supported by the lens supporting means having the smallest effective luminous flux range moves.

Preferably, a plurality of the lens groups or the image shake preventing lens groups move in directions approximately perpendicular to each other. With the construction, a deviation of the image-forming position is corrected in two dimensions when a camera movement or shake occurs. Because the lens supporting means are driven to rotate pivotally, it is unnecessary to provide the lens barrel with a member such as a guide rod extending in a tangential direction, unlike the conventional lens barrel in which lenses are driven in parallel with each other. Therefore, the lens barrel is allowed to be compact.

Because the lens supporting means which holds the lens group having the smallest effective luminous flux range is pivotally driven along the longer side of the effective luminous flux range, the lens group held thereby is allowed to be smallest.

Generally explaining, each lens group needs to cover the effective luminous flux range, even if it moves. Thus, it is necessary to construct each lens group so as to make the area of each lens frame larger by an additional amount $\Delta S$ for its pivotal motion than the area thereof when each lens group is stationary. The area $\Delta S$ is equal to the product of the length of the effective luminous flux range in a direction perpendicular to the movement direction of the lens frame and the maximum moving distance of the lens frame. It is to be noted that the maximum moving distance of the lens frame is constant irrespective of the movement direction of the lens frame. Thus, the area $\Delta S$ is smallest when the area $\Delta S$ is the product of the shorter side of the effective luminous flux range and the maximum movement distance of the lens frame. Accordingly, when the lens group having the smaller effective luminous flux range is pivoted along the longer side of the effective luminous flux range, the lens frame is smallest.

The lens supporting means is allowed to be constructed smallest when the lens group held thereby is smallest. Accordingly, the lens supporting means which holds the lens group having the smallest effective luminous flux range is allowed to be constructed smallest, by moving it along the longer side of the effective luminous flux range.

It is possible to locate a driving mechanism for the lens supporting means and a position detection mechanism, for example, at positions as radially inward as possible by utilizing the space around the smallest lens supporting means. Thus, the outer diameter of the lens barrel is allowed to be constructed small.

Therefore, the present invention provides a lens barrel in which image shake preventing afocal lenses are driven not by moving them in parallel with each other, but by a different system, and a possible smallest lens supporting means is constructed so as to allow the lens barrel to be compact in size and have a simple mechanism.

In the above construction, because the effective luminous flux range is rectangular, the aperture is normally rectangular. Thus, when the image shake preventing lens which is circular in a sectional view perpendicular to the optical axis is used, some part of the round lens, which is outside the effective luminous flux range (including a situation in which the lens supporting means is moved outside the effective luminous flux range), is not effectively used. In other words, a plurality of portions of the lens are not effectively utilized. The portions are approximately D-shaped or bow-shaped when the lens barrel is seen along the optical axis. Thus, there is no problem even though the approximately bow-shaped or D-shaped portions (i.e. arc portions relative to chord portions thereof) are eliminated from the lens.

It is preferable at least one of the lens groups, and at least one lens frame of the lens-supporting member for the at least one of the lens groups, have a generally round profile which is perpendicular to the optical axis, wherein a part of the profile thereof is formed as a cord at a predetermined location, and wherein the profile of the at least one of the lens groups, and the profile of the at least one lens frame thereof correspond to each other.

In the construction, regarding at least one lens group, used as an afocal lens group, which normally has a circular profile which is perpendicular to the optical axis, more than one D-shaped part of the profile is cut out to form more than one chord part thereof. With the cutting of the lens group, a part which is not effectively used of the lens group, i.e. a part through which the effective luminous flux does not pass, is eliminated. Thus, the lens can be constructed smaller in size.

The periphery of the lens group is surrounded with the circular frame member constituting the lens supporting means. Regarding the lens frame which has a generally circular profile which is perpendicular to the optical axis, a part or parts thereof which correspond(s) to the chord(s) of the lens group is/are cut so as to conform thereto. With the construction, the lens frame as lens supporting means can be made smaller.

Accordingly, a compact lens barrel with the optical system for preventing the image shake can be constructed, due to the smaller lens supporting means.

It is preferable that the cord of the profile is formed along the long side of the luminous flux range.

In the construction, regarding the at least the lens group, and the lens frame(s) which hold(s) the at least the lens group, each of the part(s) thereof which correspond(s) to the long side(s) of the effective luminous range is cut so as to conform thereto. If comparing the case in which the lens group and the lens frame as mentioned above, with a case in which the lens group and the lens frame are cut so that each of the part thereof which corresponds to the short side of the effective luminous range is cut, a cutting area of the former is larger than the latter. Accordingly, the lens barrel can be constructed smaller with the smaller size or construction of the lens group and its supporting means.

BRIEF DESCRIPTION OF THE DRAWINGS

These and other objects and features of the present invention will become clear from the following description taken in conjunction with the preferred embodiments thereof with reference to the accompanying drawings, in which:

FIG. 7 shows a developing construction of a cam ring which is different from the cam ring of FIG. 6;

FIG. 8 shows a developing construction of a cam ring which is different from the cam ring of FIG. 6;

FIG. 19 is a sectional view showing the driving motor, shown in FIG. 18, in assembling;

FIG. 20 is a sectional view showing the driving motor, shown in FIG. 18, in assembling;

FIG. 28A is an explanatory view of the present invention;

FIG. 28B is an explanatory view of the present invention;

FIG. 28C is an explanatory view of the present invention;

FIG. 29A is an explanatory view of the present invention;

FIG. 29B is an explanatory view of the present invention;

FIG. 29C is an explanatory view of the present invention; and

DETAILED DESCRIPTION OF THE INVENTION

Figure 1:
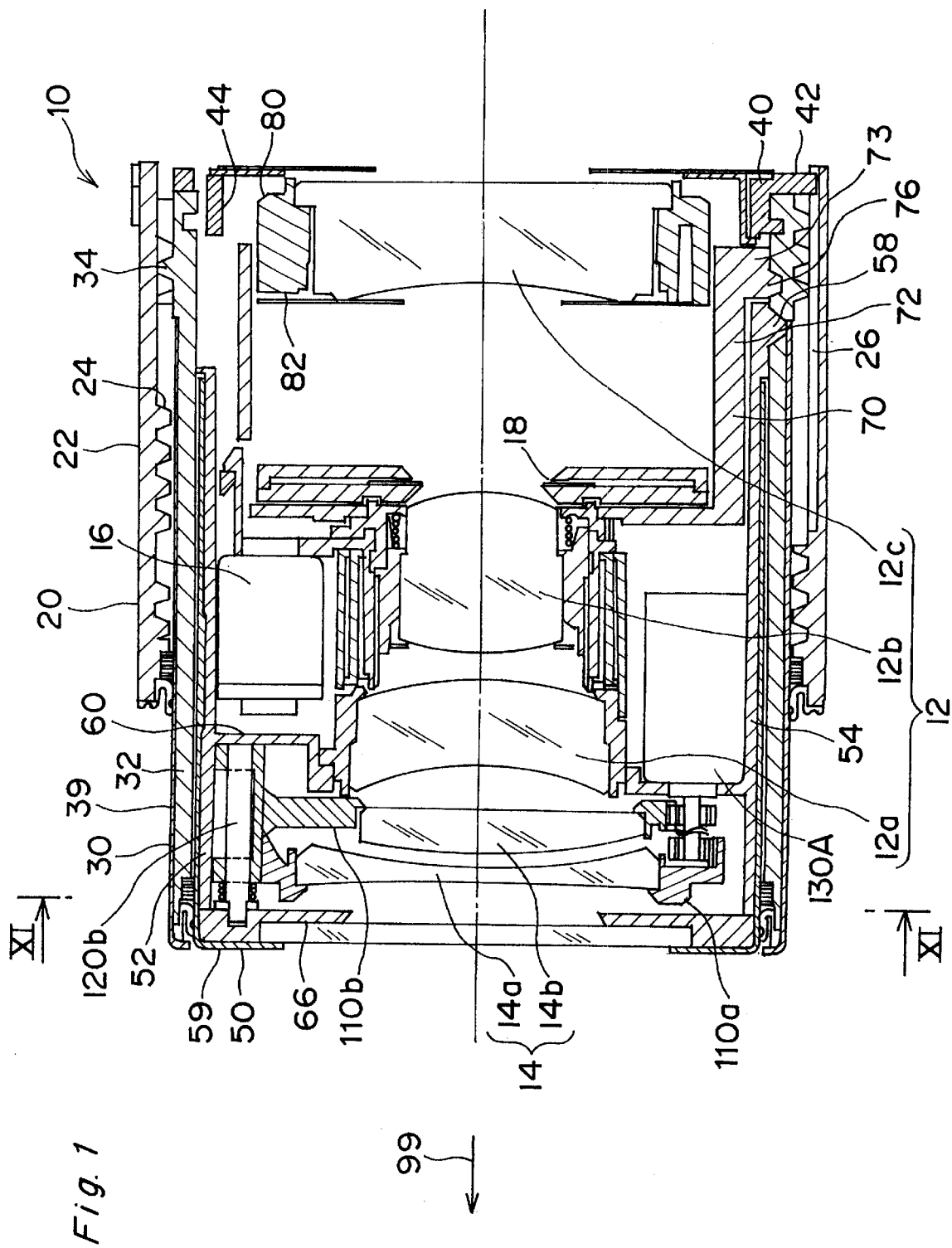
FIG. 1 is a sectional view showing a collapsed state of a lens barrel with an image shake preventing optical system according to a first embodiment of the present invention.

Before the description of the present invention proceeds, it is to be noted that like or corresponding parts are designated by like reference numerals throughout the accompanying drawings.

First, referring to FIGS. 1 through 17, a description is made below in detail on a lens barrel with an image shake preventing optical system, which is provided in a camera, according to a first embodiment of the present invention.

As shown in FIGS. 1 through 4, the lens barrel 10 comprises a fixing part 20, a first moving part 30 which is housed inside the fixing part 20, and a second moving part 50 which is housed inside the first moving part 30. The first moving part 30 moves back and forth in a direction of an optical axis relative to the fixing part 20, and the second moving part 50 moves back and forth in the direction of the optical axis relative to the first moving part 30. Namely, the lens barrel 10 is constructed to be of a collapsible type.

Also, the lens barrel 10 comprises a main photographic optical system 12 having three components, and an image shake preventing optical system 14 for correcting or compensating a deviation of an image forming position which is caused by a shake or a movement of a camera body thereof.

More specifically, the lens barrel 10 has the fixing part 20, the first moving part 30, the second moving part 50, a focus block 70, and a third lens holder 80.

Figure 2:
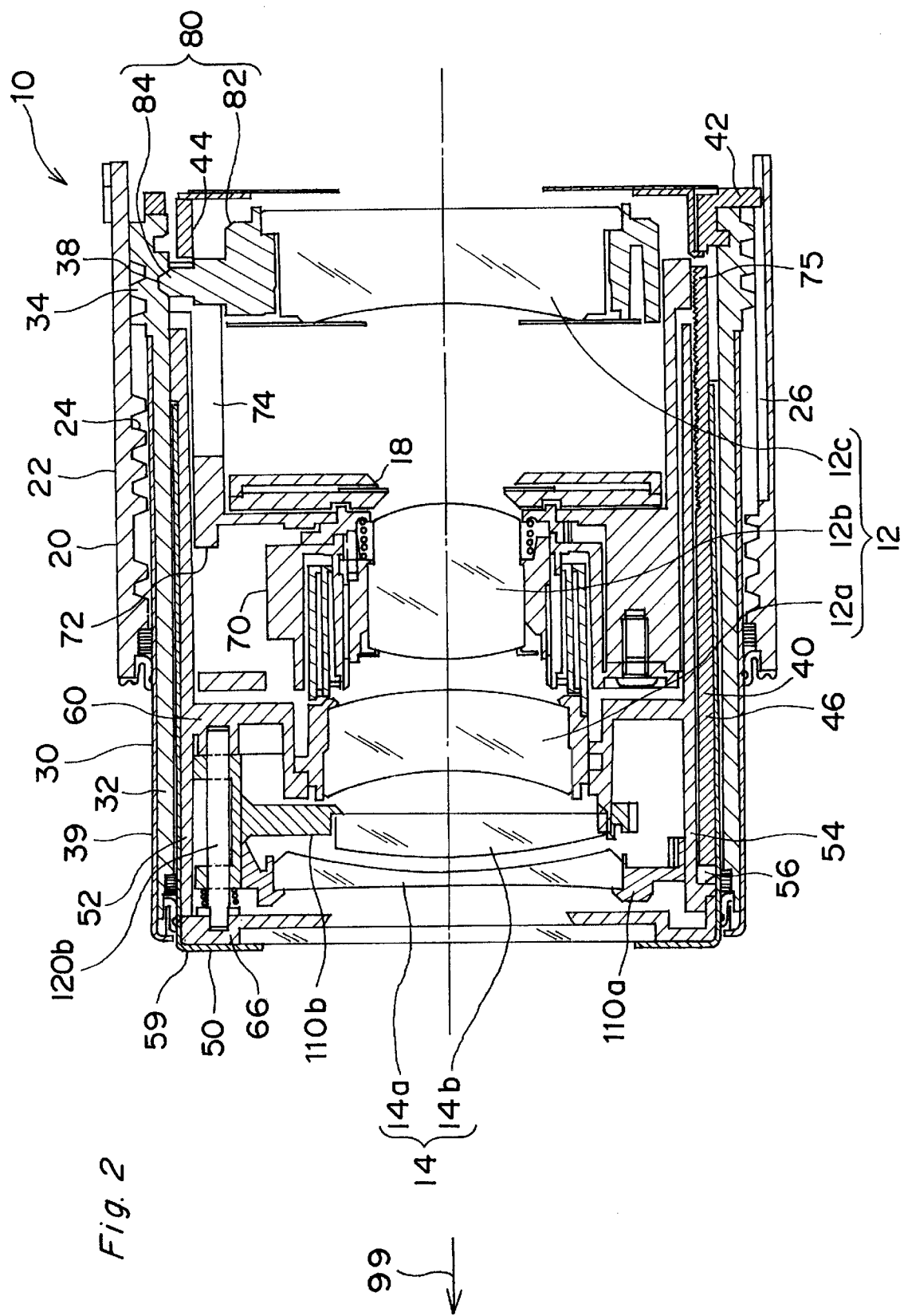
FIG. 2 is a sectional view showing a state in which the lens barrel shown in FIG. 1 is positioned at an end in the wide mode (i.e. a wide end)
Figure 3:
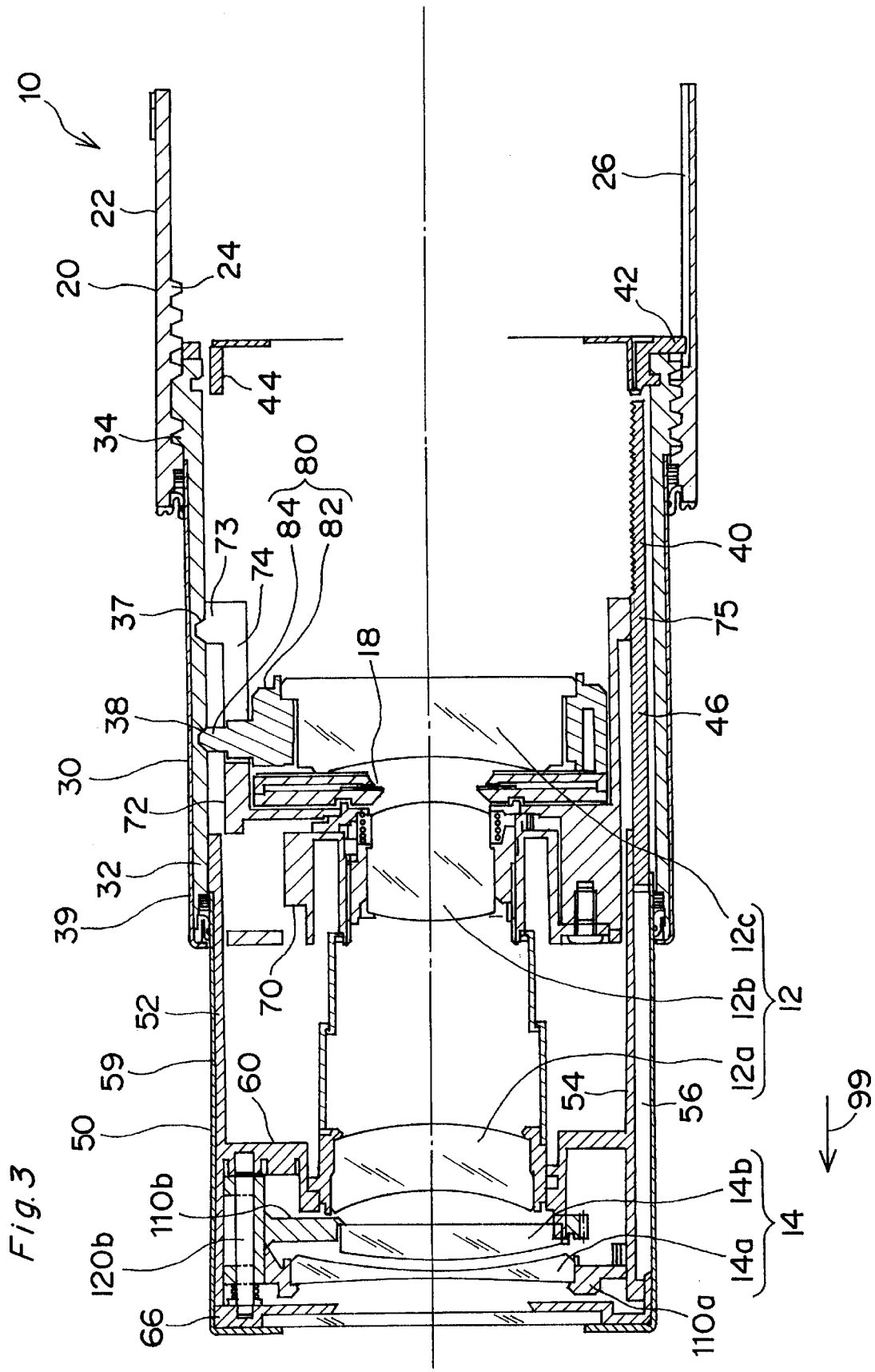
FIG. 3 is a sectional view showing a state in which the lens barrel shown in FIG. 1 is positioned at an end in a tele-mode (i.e. a tele-end)
Figure 4:
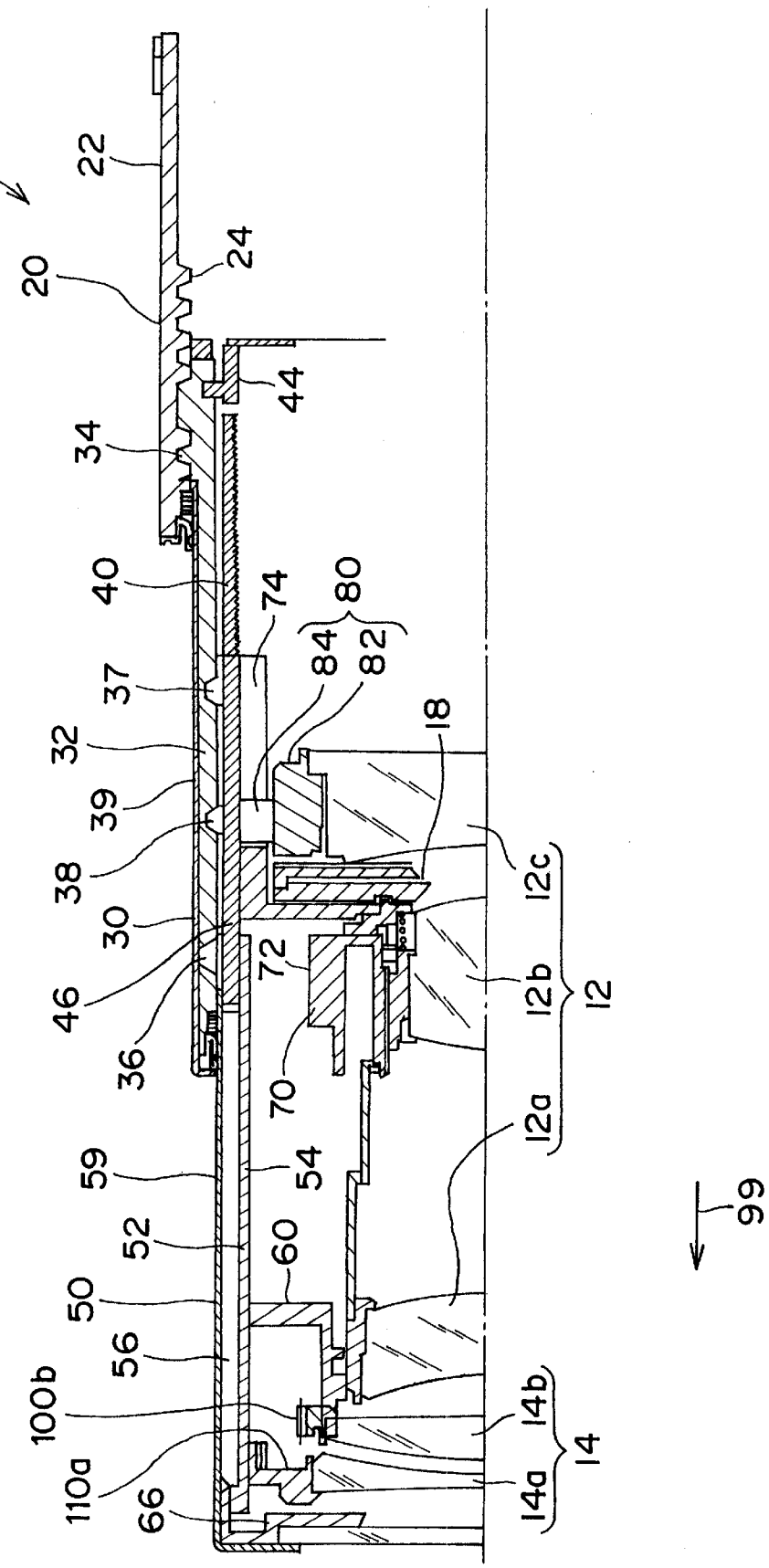
FIG. 4 is a sectional view, similar to FIG. 3, which is shown at a different sectional position.

With the mechanism, the first moving part 30 and the second moving part 50 are moved out from the fixing part 20 to a side of an object to be photographed, via a collapsed state shown in FIG. 1, a wide end state shown in FIG. 2, and a tele-end state shown in FIGS. 3 and 4, as shown by an arrow 99.

The fixing part 20 has a fixing cylinder 22 which is fixed to the camera body. An inner peripheral surface of the fixing cylinder 22 has a spiral lead 24, and has three linear guide grooves 26 which extends axially, i.e. in the direction of the optical axis.

The first moving part 30 is accommodated in the fixing cylinder 22 of the fixing part 20 so that the first moving part 30 is movable back and forth relative to the fixing cylinder 22. The first moving part 30 has a cylindrical plastic cam ring 32, and has a linearly moving cylinder 40 which is axially unmovable and rotatable relative to the cylindrical plastic cam rings 32. The linearly moving cylinder 40 is mounted inside the cam ring 32. A peripheral surface of the cam ring 32 is covered with a first thin metallic cylinder 39.

The cam ring 32 has a lead engaging portion 34, on its outer surface, which is formed at an end on a side of the camera body. The lead engaging portion 34 engages the lead 24 of the fixing cylinder 22. When the cam ring 32 is rotated by an unshown driving mechanism, the cam ring 32 moves axially with the lead engaging portion 34 of the cam ring 32 engaging the spiral lead 24 while the cam ring 32 rotates.

Figure 6:
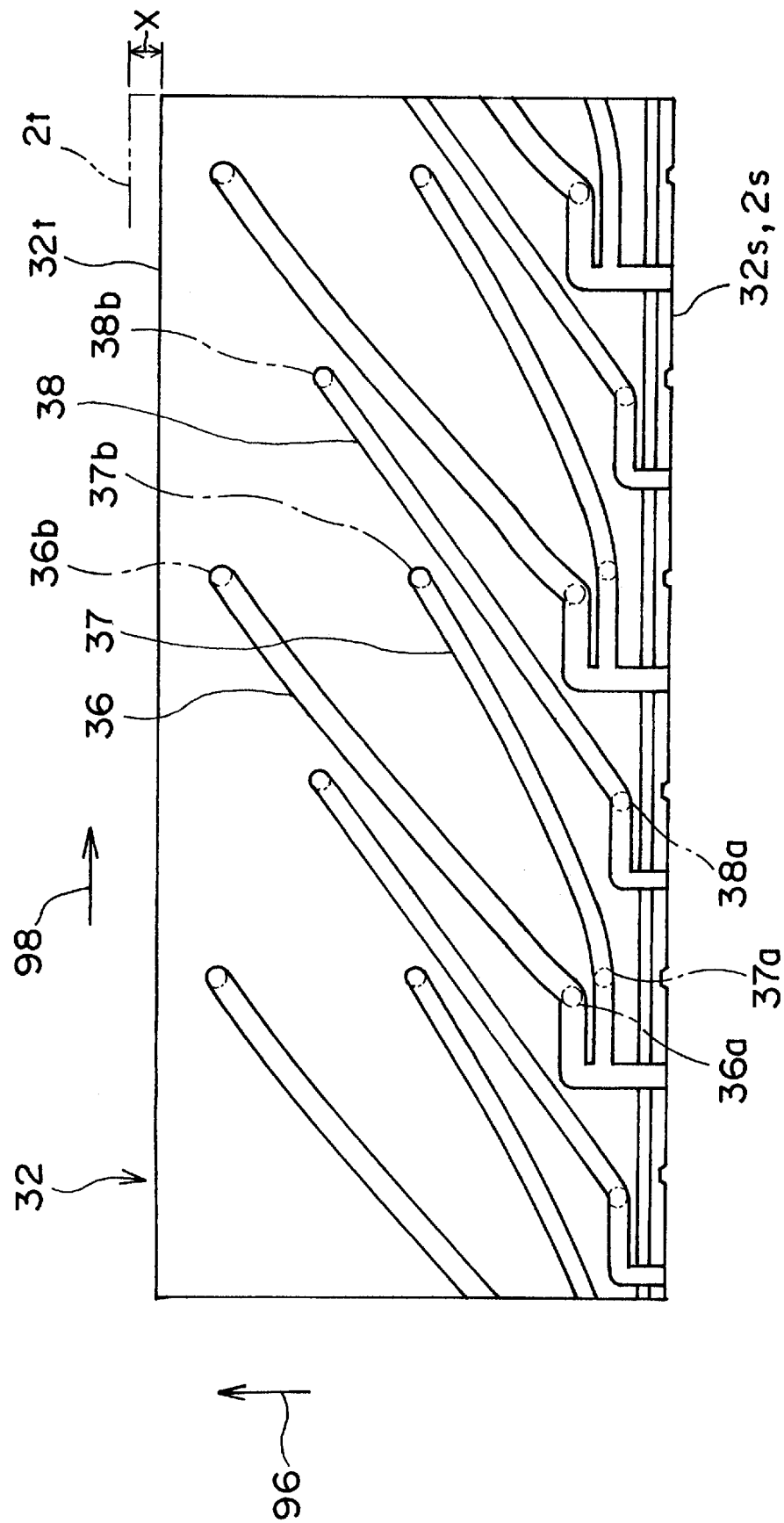
FIG. 6 shows a developing construction of a cam ring of the lens barrel shown in FIG. 1.
Figure 9A:
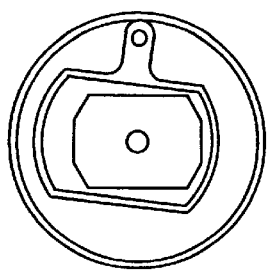
FIG. 9A is a schematic view showing a lens frame of an image shake preventing optical system.
Figure 9B:
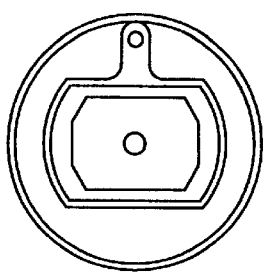
FIG. 9B is a schematic view showing the lens frame thereof.
Figure 9C:
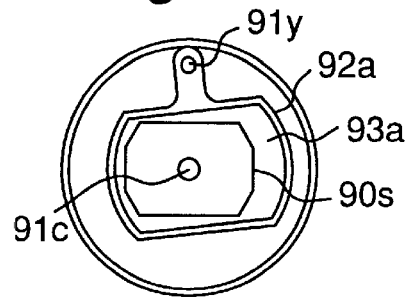
FIG. 9C is a schematic view showing the lens frame thereof.
Figure 9D:
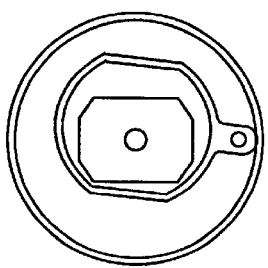
FIG. 9D is a schematic view showing the lens frame thereof.
Figure 9E:
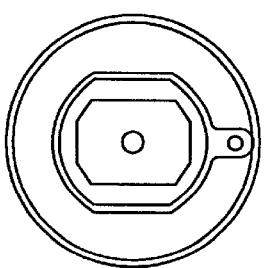
FIG. 9E is a schematic view showing the lens frame thereof.
Figure 9F:
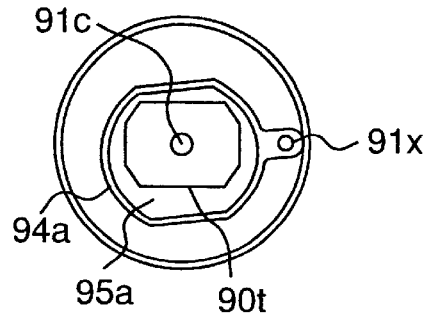
FIG. 9F is a schematic view showing the lens frame thereof.
Figure 10A:
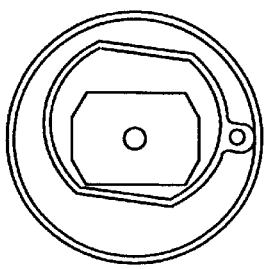
FIG. 10A is a schematic view showing a lens frame of a shake preventing optical system.
Figure 10B:
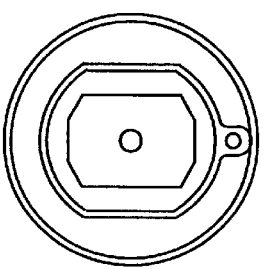
FIG. 10B is a schematic view showing the lens frame thereof.
Figure 10C:
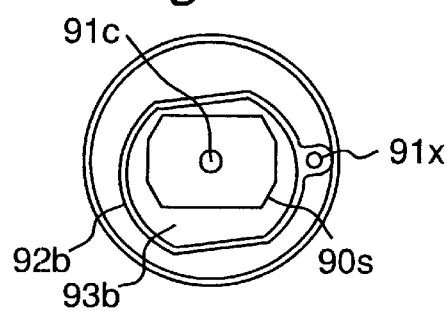
FIG. 10C is a schematic view showing the lens frame thereof.
Figure 10D:
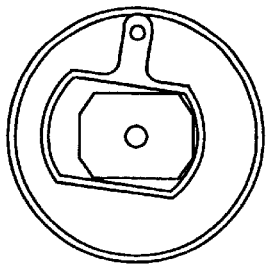
FIG. 10D is a schematic view showing the lens frame thereof.
Figure 10E:
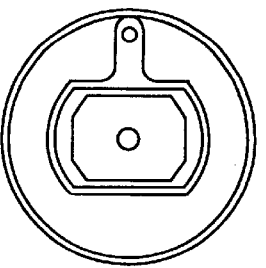
FIG. 10E is a schematic view showing the lens frame thereof.
Figure 10F:
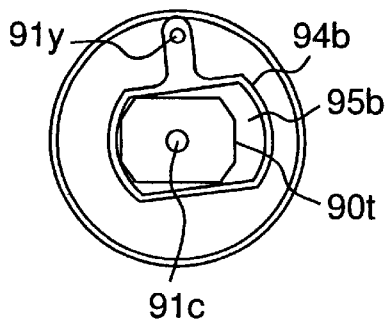
FIG. 10F is a schematic view showing the lens frame thereof.

As shown in FIG. 6, the cam ring 32 has three first cams 36 which are formed at locations which divides the peripheral surface thereof into three equal parts circumferentially, three second cams 37 which are formed at locations which also divides the peripheral surface thereof into three equal parts circumferentially, and three third cams 38 which are formed at locations which also divides the peripheral surface thereof into three equal parts circumferentially, as shown by the arrow 98 in FIG. 6.

The first cam 36 and the second cam 37 are arranged along the optical axis, as shown by the arrow 96, so that the first cam 36 is positioned forward relative to the second cam 37, i.e., so that the distance between the first cam 36 and the object to be photographed is shorter than that between the second cam 37 and the object. An pressure angle of the first cam 36 is greater than that of the second cam 37. On the other hand, the third cam 38 is located at an intermediate position between a first and second cam pair, and a first and second cam pair which is adjacent to the former cam pair, circumferentially. A pressure angle of the third cam 38 is smaller than that of the first cam 36 and greater than that of the second cam 37. As will be described later, the first cam 36 engages a cam follower 58 of a forward moving cylinder 52 of the second moving part 50, the second cam 37 engages a cam follower 76 of the focus block 70, and the third cam 38 engages a cam follower 84 of the third lens holder 80, respectively. The lens barrel 10 is driven for a zooming operation by the rotation of the cam ring 32 relative to the fixing part 20.

Figure 26:
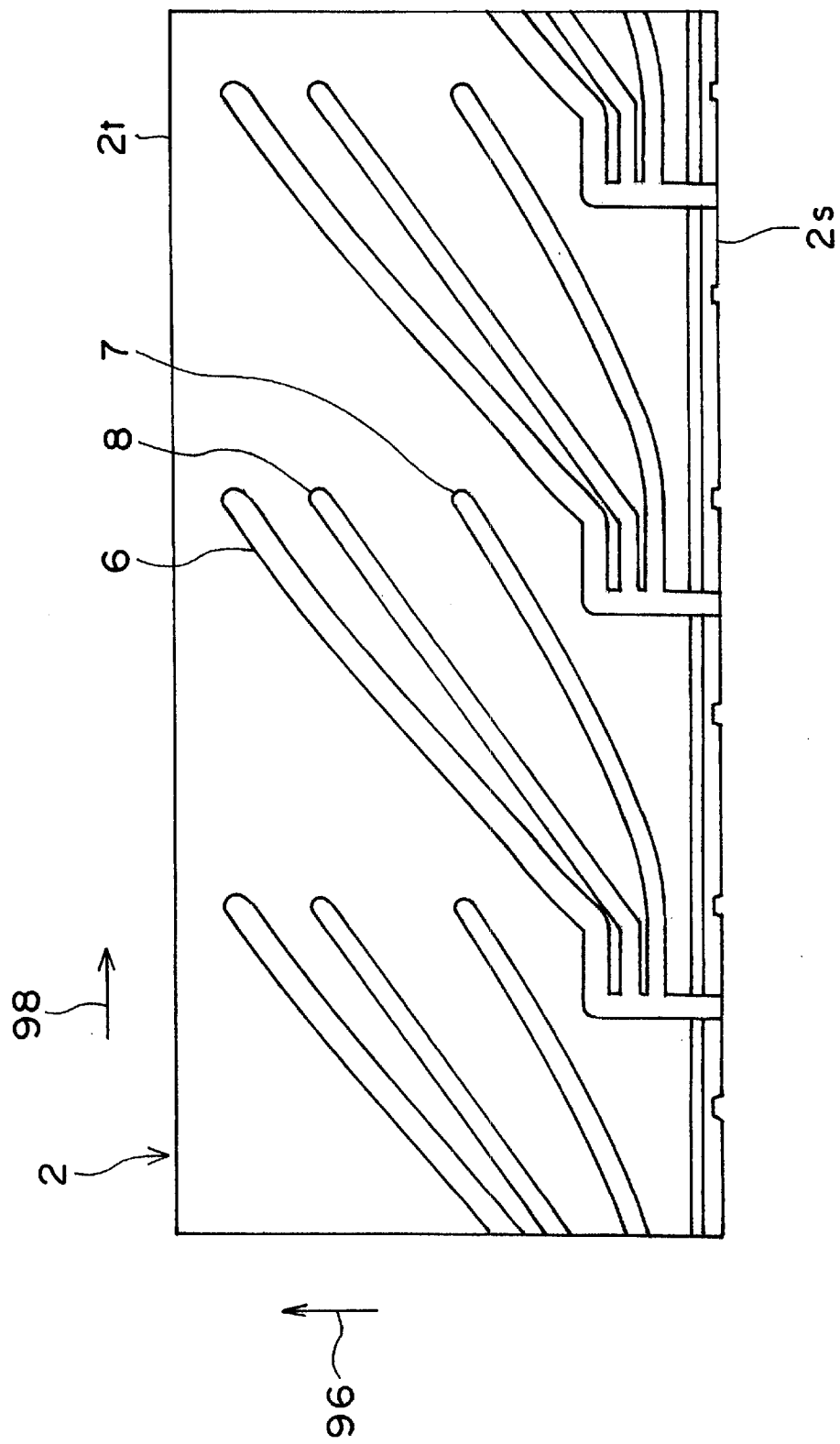
FIG. 26 is a view showing a developing construction of a conventional cam ring.
Figure 27:
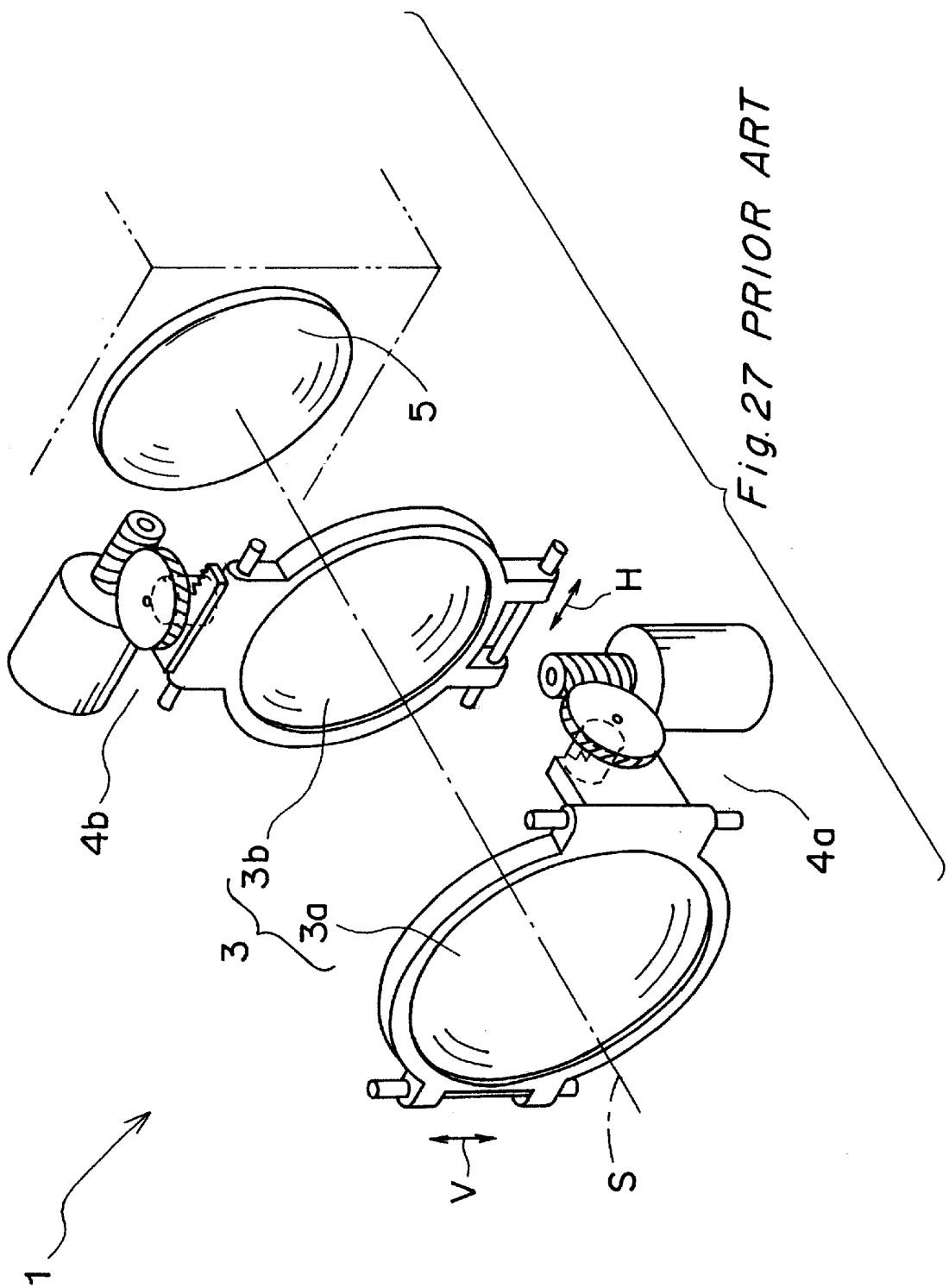
FIG. 27 is a perspective view showing a photographing lens provided with a conventional image shake preventing optical system therein.
Figure 30:
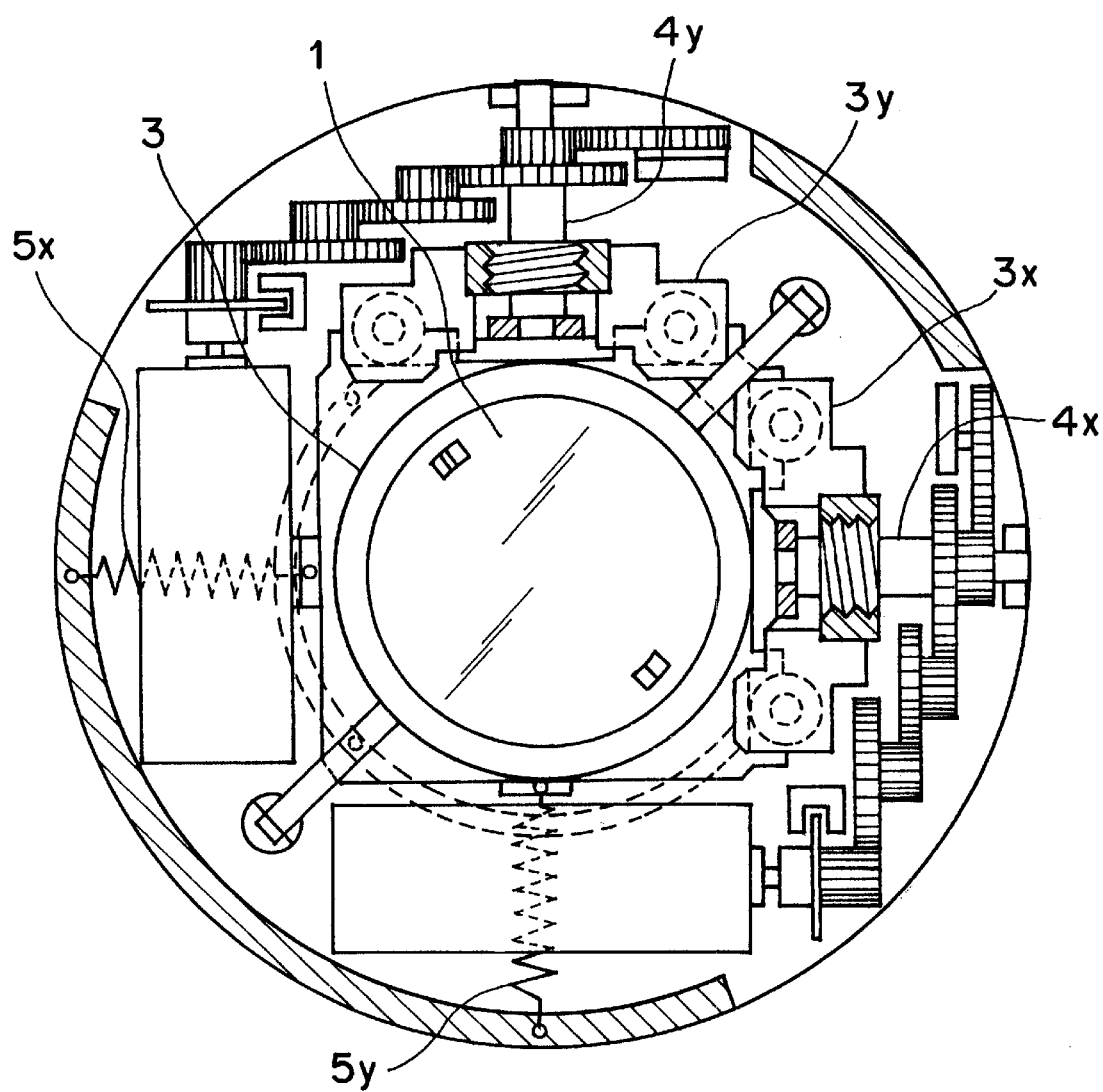
FIG. 30 is a view showing a photographing lens provided in a lens barrel with a conventional image shake preventing optical system therein.

Meanwhile, a conventional cam ring 2 has a first cam 6, a second cam 7, and a third cam 8 which are all arranged along the optical axis, as shown by the arrow 96 in FIG. 26. The diameter of the cam ring 32 of the first embodiment is equal to that of the conventional cam ring 2; however, the axial length of the cam ring 32 is shorter than that of the conventional cam ring 2 by altering the arrangement of the first, second, and third cams which have the same configurations, the same pressure angles and the lengths as those of the cams 6, 7, and 8 of the conventional cam ring 2. That is, if showing both FIG. 6, and FIG. 26 that illustrates a conventional cam ring 2, so as to compare with each other, a front end 32t of the cam ring 32 of the first embodiment is positioned backward (or rearward) to the camera body relative to a front end 2t of the conventional cam ring 2, in case of overlapping a rear end 32s of the cam ring 32 and a rear end 2s of the conventional cam ring 2. That is, the length of the cam ring 32 in its axial direction is shorter than the conventional cam ring 2 by a length X.

It is conceivable to change the forming positions of the first cam 6 or the second cam 7 circumferentially instead of changing the forming position of the third cam 8, for the purpose of making the axial length of the cam ring 32 shorter than that of the conventional cam ring 2. But in case that the first cam 6 of the cam ring 2 is changed in position circumferentially relative to the second and third cams 7 and 8, a front end 7sa of the second cam 7a becomes proximate to the first cam 6a, and the interval between the first cam 6a and the second cam 7a becomes too short, thus causing the cam ring 2y to have a low strength, as shown in FIG. 7. In the figure, a reference numeral 6a corresponds to the first cam 6 in FIG. 26; 7a to 7 therein; 8a to 8 therein; and 2y to 2 therein.

On the other hand, in case that the second cam 7 of a cam ring 2 is changed in position circumferentially relative to the first cam 6 and the third cam 8, a front end 7sb of the second cam 7b interferes with the first cam 6b, as shown in FIG. 8. In the figure, a reference numeral 6b corresponds to the first cam 6 in FIG. 26; 7b to 7 therein; 8b to 8 therein; and 2x to 2 therein.

Furthermore, in case that the first, second, and third cams 6, 7, and 8 are changed in position circumferentially relative to each other, they are more likely to interfere with each other.

Meanwhile, in case of changing the inclination of the first, second, and third cams 6, 7, and 8 so as to prevent mutual interference of cams with each other, it is possible to avoid such a mutual interference of cams with each other and to avoid approaching them to each other. However, because the pressure angle thereof is greater and hence a greater driving force for driving a cam follower which is driven by the cam is required, it makes it difficult to drive the lens barrel smoothly for a zooming operation. Accordingly, in order to axially shorten the length of the cam ring 32 having the same diameter as that of the conventional cam ring 2, it is appropriate to adopt the construction of the first, second, and third cams 36, 37, and 38.

Figure 5:
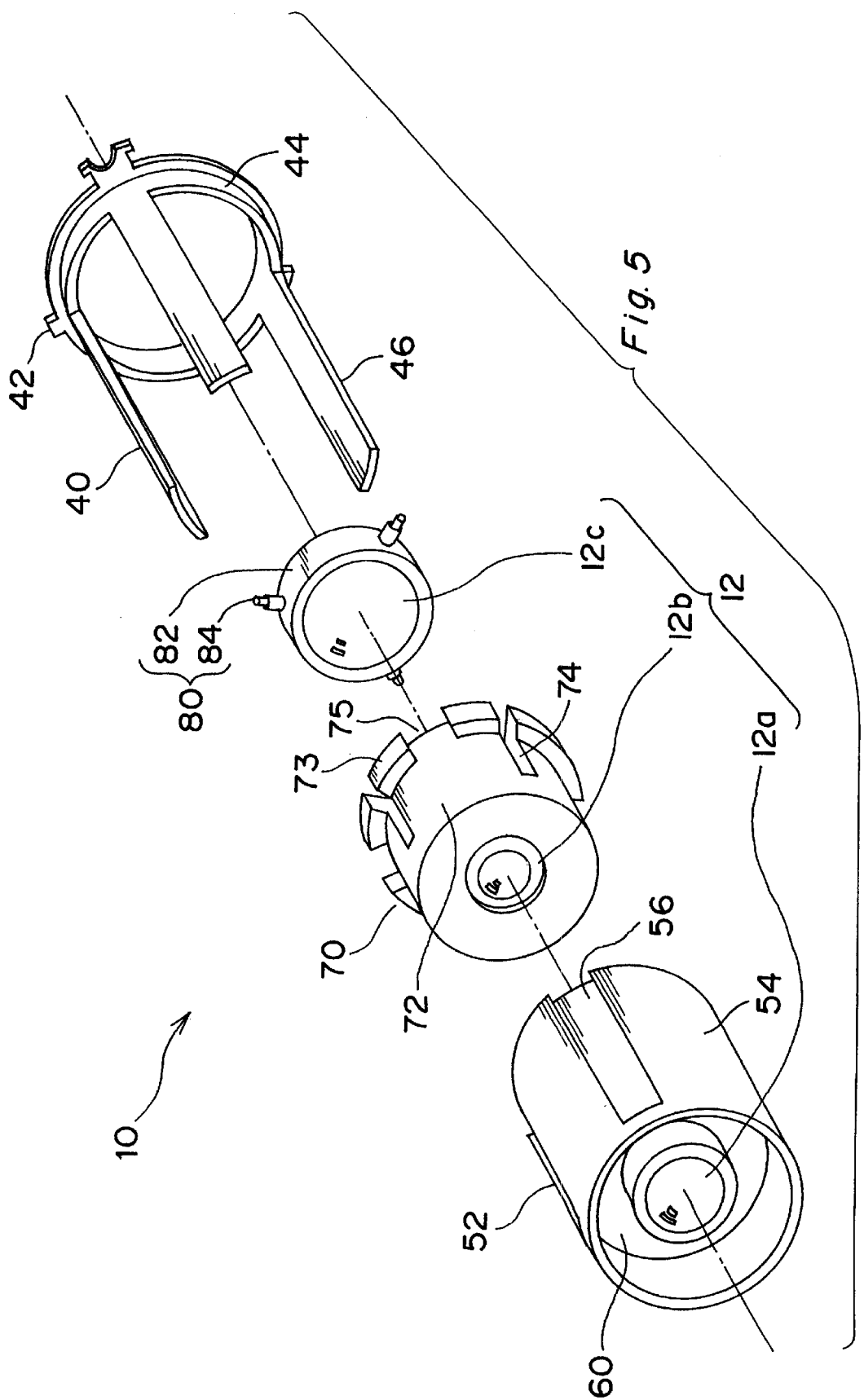
FIG. 5 is an exploded, enlarged perspective view showing some parts of the lens barrel shown in FIG. 1.

The linearly moving cylinder 40 is positioned proximately to the inner peripheral surface of the cam ring 32. As shown in FIG. 5, the linearly moving cylinder 40 has three guide arms 46 extending axially from a cylindrical portion 44 positioned on a side of the camera body toward the object-positioned side. A linearly moving engaging portion 42 projects from a peripheral surface of the cylindrical portion 44, and the linearly moving engaging portion 42 slidably contacts the linear guide groove 26 of the fixing part 20. With the construction, the linearly moving cylinder 40 is guided linearly axially by the fixing part 20 without the linearly moving cylinder 40 rotating relative to the fixing cylinder 22.

A peripheral surface of the first thin cylinder 39 is exposed to the outside when the first moving part 30 is fed forward from the fixing part 20.

The first moving part 30 accommodates the second moving part 50 at the object-positioned side, the focus block 70 positioned intermediate between the second moving part 50 and the third lens holder 80, and the third lens holder 80 positioned on the camera body side.

The second moving part 50 is movable forward and backward relative to the first moving part 30. The second moving part 50 has a plastic forward moving cylinder 52 and a metallic second thin cylinder 59 covering the peripheral surface of the forward moving cylinder 52.

As shown in FIGS. 2, 3, and 5, the forward moving cylinder 52 is substantially cylindrical and a part thereof is curved radially inwardly to form a guide groove 56 extending axially. A guide arm 46 of the linearly moving cylinder 40 of the first moving part 30 is inserted into the guide groove 56, so that the forward moving cylinder 52 is linearly axially guided without the forward moving cylinder 52 rotating relative to the linearly moving cylinder 40.

The guide arm 46 of the linearly moving cylinder 40 is sandwiched between a peripheral wall 54 forming the guide groove 56 of the forward moving cylinder 52 and the second thin cylinder 59 covering the peripheral surface of the forward moving cylinder 52, so that the periphery of the guide arm 46 is covered therewith, and so that the guide arm 46 is prevented from moving radially and circumferentially. Also, with the construction, the guide arm 46 is prevented from dislocating from the guide groove 56, because the guide arm 46 is surrounded with the peripheral wall 54 and the second thin cylinder 59 when a circumferential force is exerted upon the guide arm 46. Accordingly, the guide arm 46 is allowed to have a small radial size thereof, and is allowed to be constructed as a thin guide arm.

As shown in FIGS. 1 and 4, the forward moving cylinder 52 has a cam follower 58 which projects radially outwardly on its outer surface, and which is driven by the first cam 36 of the cam ring 32 with the cam 36 engaging with the cam follower 58.

With the construction, the guide arm 46 of the linearly moving cylinder 40 prevents the forward moving cylinder 52 from rotating relative to the linearly moving cylinder 40. Thus, when the cam ring 32 is rotated, the cam follower 58 is moved and driven axially by the first cam 36 of the cam ring 32 without rotating, and the forward moving cylinder 52, namely, the second moving part 50 is fed forward from the cam ring 32, namely, from the first moving part 30.

An intermediate wall 60 extending circumferentially is formed inside the forward moving cylinder 52 on a side of the object to be photographed. The intermediate wall 60 supports the first lens group 12a inside the lens barrel 10. A front wall 66 is provided on an end of the forward moving cylinder 52 at the object-positioned side. As will be described in detail later, between the front wall 66 and the intermediate wall 60, a first lens 14a and a second lens 14b of the shake preventing optical system 14 are rotatably supported by a first lens frame 110a and a second lens frame 110b, respectively.

The peripheral surface of the second thin cylinder 59 is exposed to the outside, similarly to the first thin cylinder 39, when the second moving part 50 is fed forward from the first moving part 30.

The focus block 70 supports a second lens group 12b of the main photographic optical system 12 inside the substantially cylindrical body 72 at the object-positioned side. The second lens group 12b is moved axially by a focus unit 16 (see FIG. 1) fixed to the approximately cylindrical body 72 in order to adjust its focusing. A shutter unit 18 is accommodated inside the cylindrical body 72 on a side of the camera body with respect to the second lens group 12b. The cylindrical body 72 has three linear guide grooves 74 extending axially through the peripheral wall of the cylindrical cal body 72 itself on the camera body side with respect to the shutter unit 18.

A flange 73 is formed on the cylindrical body 72 on the camera body side. As shown in FIG. 1, three cam followers 76 project radially outwardly from the flange 73. The cam followers 76 engage the second cam 37 of the cam ring 32. As shown in FIG. 5, a linear guide groove 75 penetrating axially through is formed on the flange 73, so that the focus block 70 is guided linearly by the engagement between the linear guide groove 75 and the guide arm 46 of the linearly moving cylinder 40. Thus, when the cam ring 32 rotates relative to the linearly moving cylinder 40, the cam follower 76 is driven and moved by the second cam 37 of the cam ring 32, thus moving the focus block 70.

The third lens holder 80 is positioned on the camera body side with respect to the focus block 70. The third lens holder 80 has a substantially cylindrical body 82 supporting a third lens group 12c and three cam followers 84 projecting radially outwardly from the peripheral surface of the cylindrical body 82. Each cam follower 84 engages the third cam 38 of the cam ring 32 with each cam follower 84 slidably penetrating through the linear guide groove 74 of the focus block 70. With the construction, when the cam ring 32 rotates relative to the linearly moving cylinder 40, the cam follower 84 is driven and moved axially by the third cam 38 of the cam ring 32 with the third lens holder 80 being prevented from rotating by the focus block 70, while the cam follower 84 is being axially guided by the linear guide groove 74 of the focus block 70. In this way, the third lens holder 80 is moved by the third cam 38 of the cam ring 32.

By the way, it is possible to form the linear guide groove 74 guiding the cam follower 84 of the third lens holder 80 linearly not on the focus block 70, but on the forward moving cylinder 52.

Alternatively, it is possible to form the linear guide groove 74 guiding the cam follower 84 of the third lens holder 80 linearly on both the forward moving cylinder 52 and the focus block 70. In this case, it is possible to linearly guide the third lens holder 80 by both linear guide grooves, by restricting the relative rotation of the third lens holder 80 in one direction by means of the linear guide groove of the forward moving cylinder 52, and by restricting the relative rotation of the third lens holder 80 in the other direction by means of the linear guide groove of the focus block 70.

As described above, in the lens barrel 10, when the cam ring 32 is rotated by the unshown driving mechanism, the first moving part 30 and the second moving part 50 are driven forward relative to the fixing part 20, and the first, second, and third lens group 12a, 12b, and 12c of the main photographic optical system 12 accommodated inside the lens barrel 10 are also driven axially to perform a zooming operation. That is, upon a start of rotation of the cam ring 32, the lens barrel 10 is moved forward from the collapsed state (see FIG. 1), to the wide end state (see FIG. 2).

Namely, the cam followers 58, 76, and 84 of the forward moving cylinder 52 of the second moving part 50, the focus block 70, and the third lens holder 80, are positioned at the end positions 36a, 37a, and 38a in the wide mode, as shown by one-dot chain line in FIG. 6. Meanwhile, when the cam ring 32 is rotated further from the state corresponding to the end positions 36a, 37a, and 38a in the wide mode, the cam followers 58, 76, and 84 is driven and moved to the end positions 36b, 37b, and 38b in the tele mode as shown by one-dot chain line in FIG. 6 along the cams 36, 37, and 38, thus positioning the lens barrel 10 at the end position in the tele-mode (see FIGS. 3 and 4.)

Next, the image shake preventing optical system 14 of the lens barrel 10 will be described below with reference to FIGS. 9 through 17.

As described above, the image shake preventing optical system 14 comprises the first lens 14a and the second lens 14b, and is positioned at the end of the forward moving cylinder 52 on the object-positioned side with respect to the main photographic optical system 12.

In the image shake preventing optical system 14, the first and second lens 14a and 14b are afocal lenses. Thus, the first lens 14a cancels a specific optical characteristic of the second lens 14b, and the second lens 14b cancels a specific optical characteristic of the first lens 14a. Therefore, the image shake preventing optical system 14 does not have any specific optical characteristic as a whole.

The first lens 14a and the second lens 14b rotate in a direction substantially perpendicular to the optical axis, respectively, and the first lens 14a and the second lens 14b rotate in a direction perpendicular to each other, so as to correct or compensate the deviation of an image-forming position when the camera body is shaked or moved at time of photographing. That is, when such a shake is detected by an unshown detection means such as a gyro-sensor, a deviation of the image forming position due to the shake is predicted and estimated by calculation. Then, the first lens 14a and/or second lens 14b are controlled to be moved in such a direction as cancelling the deviation. With this construction, the fluctuation in the image forming position at time of exposing a film inside the camera body to light, can be restricted to an allowable range; thus, minimizing an affect of the shaking or movement of the camera body.

Because the image shake preventing optical system 14 is positioned on the object-positioned side with respect to the main photographic optical system 12, the influence given to the optical performance carried out by the movement of the first lens 14a and/or the second lens 14b is smaller than that given thereto by the movement of a part of the main photographic optical system 12, or by the movement due to a construction in which the image shake preventing optical system comprising an afocal lens is positioned at an intermediate position of the main photographic optical system 12. Therefore, the lenses 14a and 14b of the image shake preventing optical system 14 can be designed easily. In addition, the positions of the first lens 14a and the second lens 14b can be controlled easily, because the moving amount thereof to be controlled does not become too small.

Next, the mechanism of the image shake preventing optical system 14 is described below.

Figure 11:
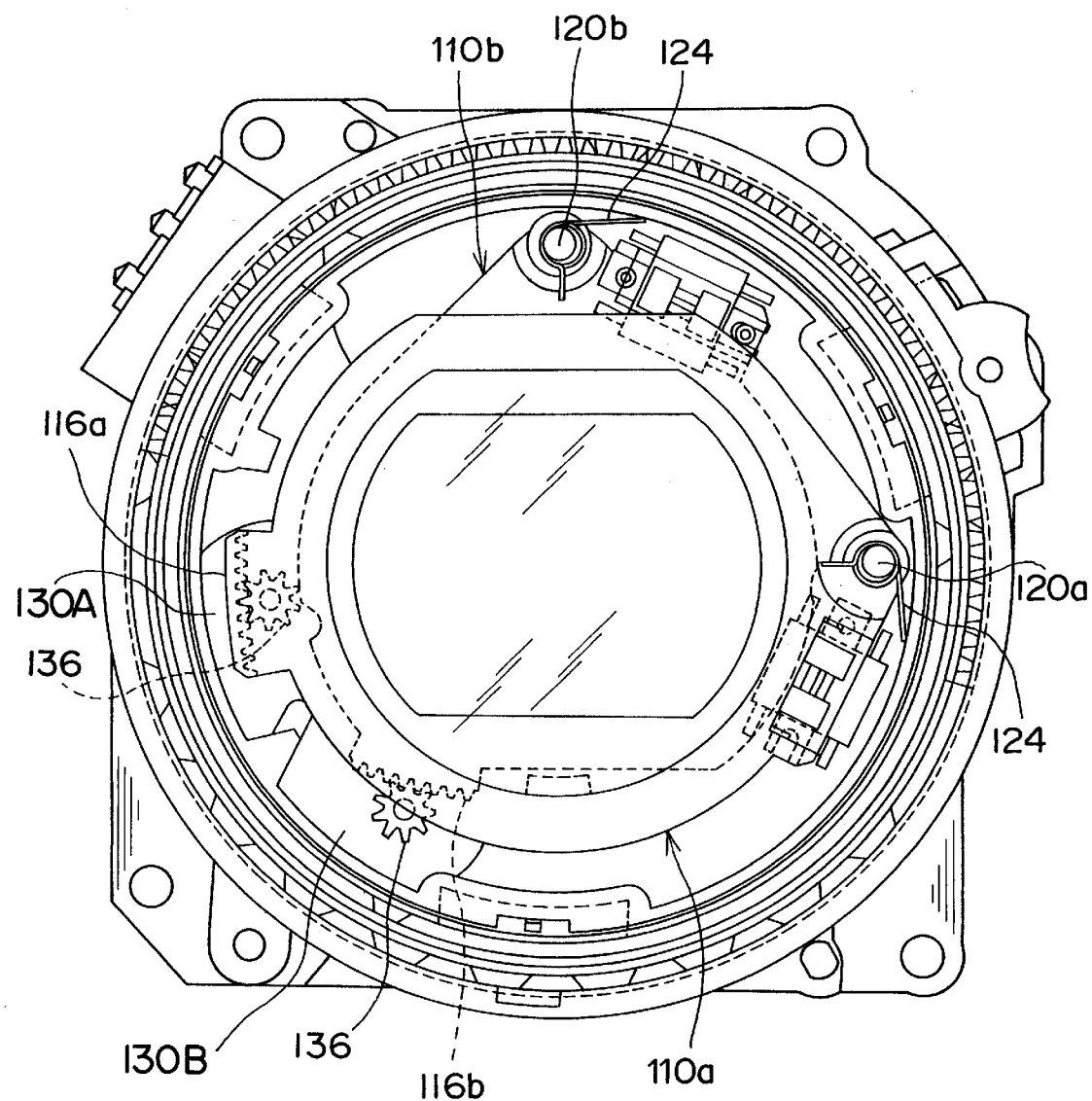
FIG. 11 is a front view showing the image shake preventing optical system of the lens barrel, shown in FIG. 1, in assembling.
Figure 12:
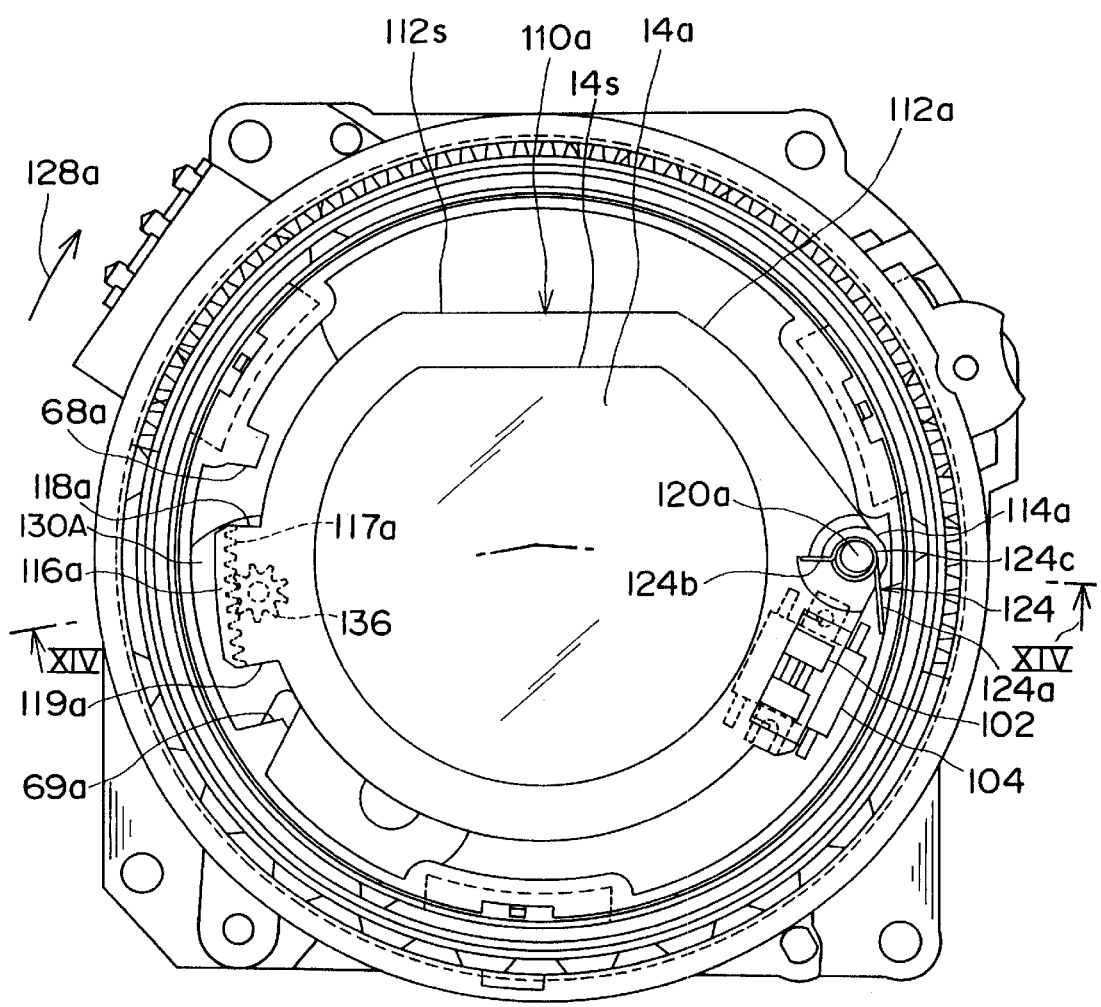
FIG. 12 is a front view showing some parts of a first lens of the image shake preventing optical system of the lens barrel shown in FIG. 11.
Figure 13:
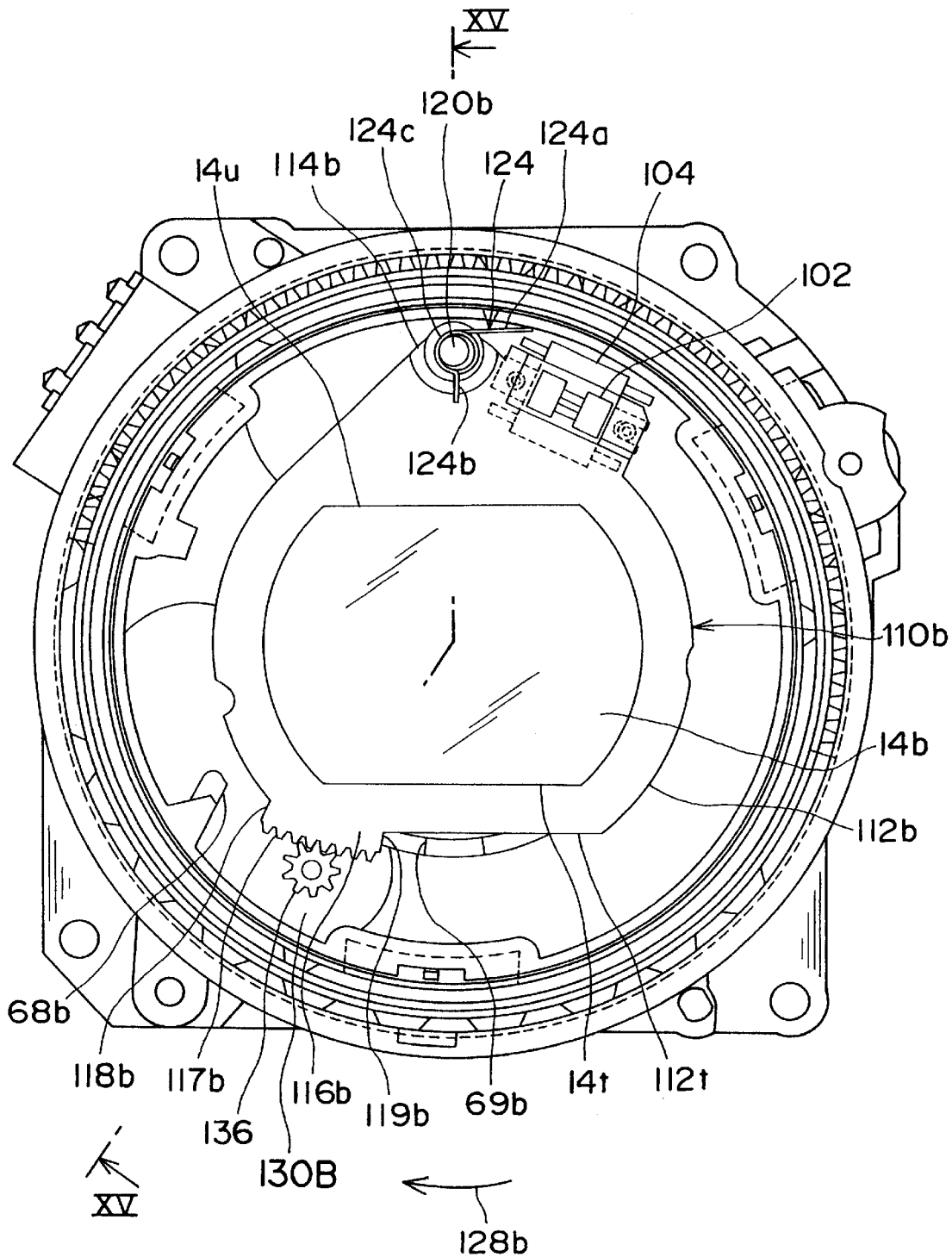
FIG. 13 is a front view showing some parts of a second lens of th e shake preventing optical system of the image lens barrel shown in FIG. 11.
Figure 14:
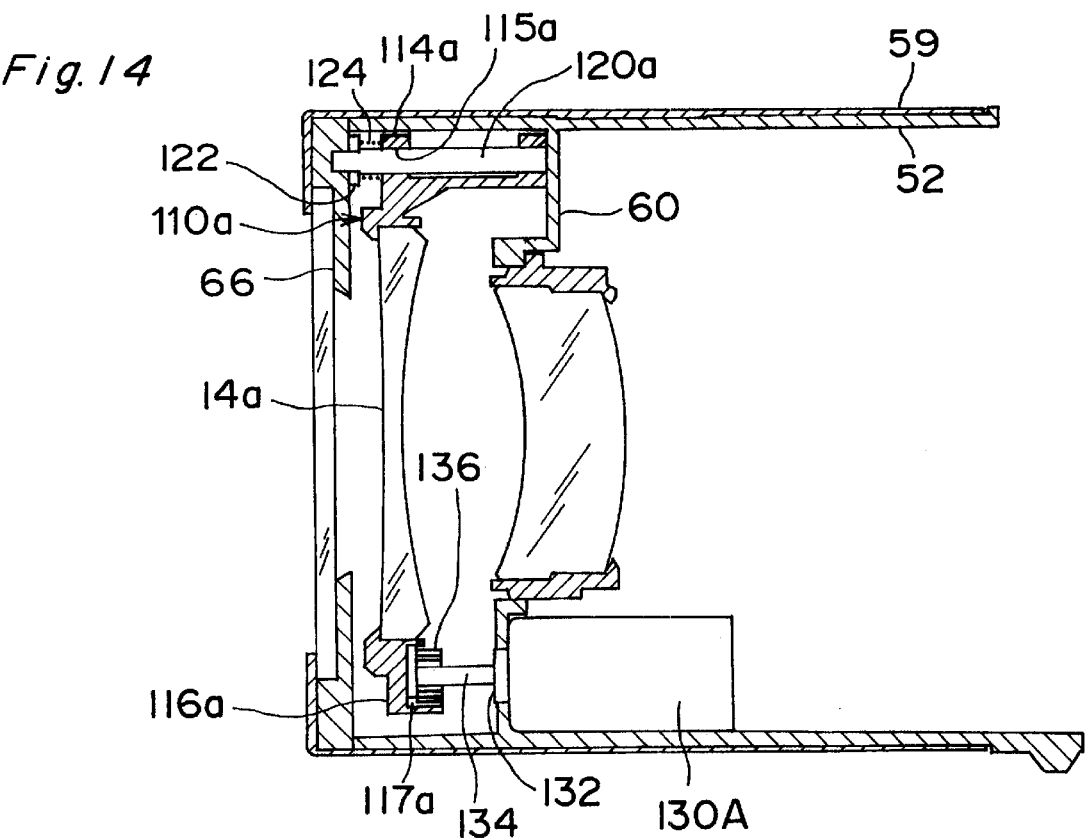
FIG. 14 is a sectional view taken along a line A—A of FIG. 12.
Figure 15:
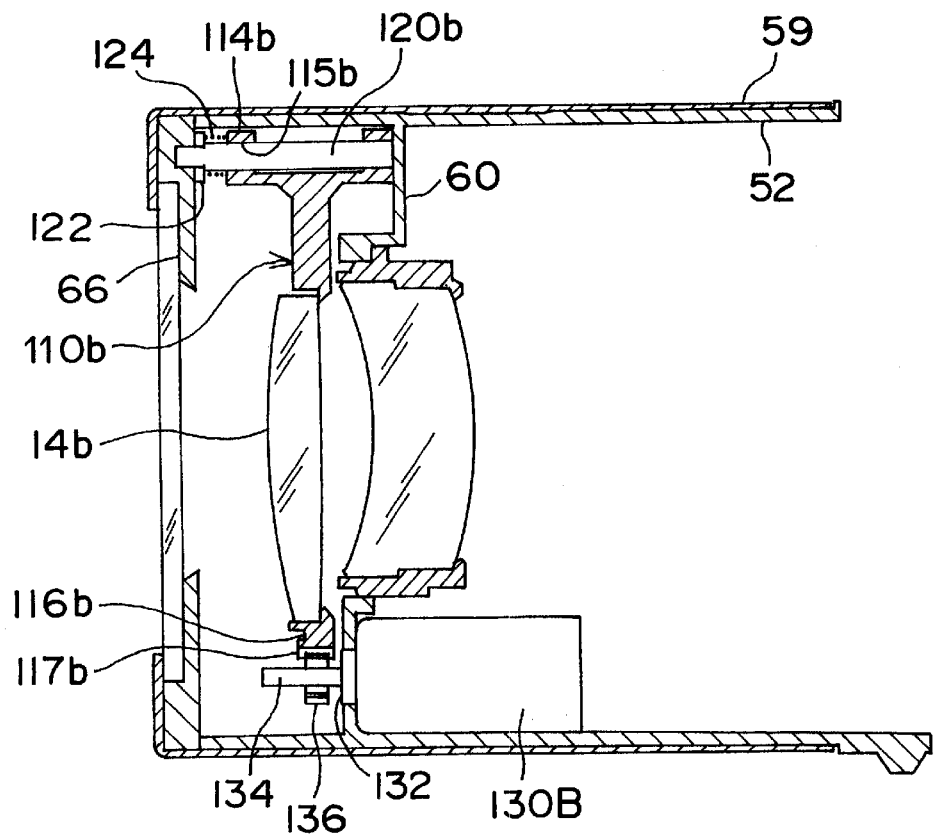
FIG. 15 is a sectional view taken along a line B—B of FIG. 13.

As shown in FIG. 11 which shows the shake preventing optical system from the object-positioned side through the front wall 66 of the forward moving cylinder 52, and as shown in FIGS. 12 and 13, the first and second lenses 14a and 14b of the image shake preventing optical system 14 are supported by the first and second lens frames 110a and 110b, respectively. As shown in FIGS. 11, 14, and 15, the first lens frame 110a is provided on the object side relative to the second lens frame 110b. The first and second lens frames 110a and 110b are positioned between the front wall 66 and the intermediate wall 60, both of which extend from the forward moving cylinder 52 in the direction perpendicular to the optical axis. The first and second lens frames 110a and 110b are rotatably supported by a first supporting shaft 120a and a second supporting shaft 120b, respectively, which are positioned in parallel with the optical axis.

As shown in FIG. 12, the first lens frame 110a comprises a frame body 112a which surrounds and supports the first lens 14a, a shaft supporting portion 114a which supports the frame body 112a and which is located in a position opposing to the first lens 14a or to the optical axis, and an input portion 116a which is also located in a position opposing to the first lens 14a or to the optical axis.

Similarly, as shown in FIG. 13, the second lens frame 110b comprises a frame body 112b which surrounds and supports the second lens 14b, a shaft supporting portion 114b which supports the frame body 112b and which is located in a position opposing to the second lens 14b or to the optical axis, and an input portion 116b which is also located in a position opposing to the second lens 14a or to the optical axis.

The frame body 112a and the frame body 112b are constructed to have a certain width along the periphery of the first lens 14a and the second lens 14b for supporting the lenses 14a and 14b thereby, respectively. The original shapes of the first lens 14a and the second lens 14b are round; however, in order to secure a space inside the lens barrel 10, the upper part of the circular first lens 14a, and the upper and lower parts of the circular second lens 14b, are cut off so that the first and second lenses 14a and 14b have a general shape of a letter "D", respectively. That is, as shown in FIGS. 11 through 13, a part of the first lens 14a relative to a direction perpendicular to the optical axis is formed as a linear chord 14s, and a part of the second lens 14b relative to the direction perpendicular to the optical axis is formed as linear chords 14t and 14u, respectively.

The frame bodies 112a and 112b have an unshown slit penetrating therethrough along the optical axis, respectively. A LED (i.e. light emitting diode) 102 is fixed on a side of the object to be photographed relative to the frame bodies 112a and 112b so that the LED faces the unshown slit. Meanwhile, a position detection element 104 for detecting a light which is emitted by the LED 102 and passes through the slit is mounted on the forward moving cylinder 52 of the lens barrel 10 so as to face each of the slit of the frame bodies 112a and 112b.

As shown in FIGS. 14 and 15, in the first and second lens frames 110a and 110b, each of the first and second supporting shafts 120a and 120b is inserted into each of shaft holes 115a and 115b of each of the shaft supporting portions 114a and 114b and rotatably supported thereby. As shown in FIGS. 11 and 12, the first lens frame 110a pivots on the first supporting shaft 120a in the direction substantially perpendicular dicular to the camera body, i.e., the first lens frame 110a pivots vertically in a shape of a circular arc, because the first supporting shaft 120a is fixed to a right side of the optical axis when the image shake preventing optical system is viewed along the optical axis from the object-positioned side.

As shown in FIGS. 11 and 13, the second lens frame 110b pivots on the second supporting shaft 120b in the direction substantially horizontal with respect to the camera body, i.e., the second lens frame 110b pivots the right-to-left direction in a shape of a circular arc, because the second supporting shaft 120b is fixed above the optical axis.

Alternatively, it is possible to construct the first and second lens frames 110a and 110b in such a manner that the second lens frame 110b pivots substantially vertically and that the first lens frame 110a pivots in the direction substantially horizontal with respect to the camera body. But as indicated in FIGS. 9A through 10F showing the lens frame, the configuration of the first embodiment allows the second lens frame 110b to be constructed smallest.

That is, FIGS. 9A through 9F are schematic views showing a state in which a first lens frame 92a located at the object-positioned side pivots in the right-to-left direction and in which a second lens 94a located at the camera body side pivots vertically. On the other hand, FIGS. 10A through 10F are schematic views showing a state in which a first lens frame 92b pivots vertically and in which a second lens 94b pivots in the right-to-left direction.

In FIGS. 9A through 9F and FIGS. 10A through 10F, an effective luminous flux range 90s at the position of the first lens frame 92a located at the object-positioned side is equal to that at the position of the first lens frame 92b located at the object-positioned side, and an effective luminous flux range 90t at the position of the second lens frame 94a located at the camera body side is equal to that at the position of the first lens frame 94b located at the camera body side. The "effective luminous flux range" 90s or 90t can be defined as a section of an effective optical path through which a luminous flux reaching the frame passes. The effective luminous flux range 90s located at the object-positioned side is greater than the effective luminous flux range 90t located at the camera body side. The distance between the optical axis 91c and the rotation center 91y of the first lens frame 92a as well as the first lens frame 92b is equal to that between the optical axis 91c and the rotation center 91x of the second lens frame 94a as well as the second lens frame 94b. The pivotal angle of the first lens frames 92a and 92b and that of the second lens frames 94a and 94b are equal to each other. The following distances are also equal to each other: the distance between the first lens frame 92a and the lens aperture 93a, distance between the first lens frame 92b and the lens aperture 93b, the distance between the second lens frame 94a and the lens aperture 95a, and the distance between the second lens frame 94b and the lens aperture 95b. FIGS. 9A through 9F, and FIGS. 10A through 10F show cases in which the first lens frames 92a and 92b and the second lens frames 94a and 94b are so constructed that the lens apertures 93a, 93b, 95a, and 95b cover the effective luminous flux ranges 90s and 90t.

In comparing the lens frames shown in FIGS. 9A through 9F, and FIGS. 10A through 10F with each other, the second lens frame 94b shown in FIGS. 10A through 10F is smaller than the second lens frame 94a shown in FIGS. 9A through 9F. This indicates that the smallest lens frame can be used in case that the second lens frame 94b having the smaller effective luminous flux range 90t pivots in the direction of the longer side of the effective luminous flux range 90t. This is explained as follows:

That is, supposing that an area S is required to cover the effective luminous flux range when the lens frame is stationary, it is necessary to make the lens frame larger by an of amount $\Delta S$ in its pivotal motion to cover the effective luminous flux range. The smaller the effective luminous flux range is, the smaller is the area S of the lens frame required to cover the effective luminous flux range when it is stationary. The area $\Delta S$ is approximately equal to the product of the half of an amplitude W in the direction of the pivotal motion of the lens frame and a length L of an effective luminous flux range in a direction perpendicular to the pivotal direction. It is to be noted that the half of the amplitude W in the pivotal direction is approximately constant if the pivotal angle is same, and the shorter side of the lens frame has the shortest length L of the effective luminous flux range. Accordingly, when both the area S and area $\Delta S$ are smallest, i.e., when the lens frame having the smaller effective luminous flux range is pivoted along the longer side of the effective luminous flux range, the area of the lens frame is smallest.

As described above, because the second lens frame 110b is smallest, the space for installing a driving mechanism for driving the first lens frame 110a, a detection device, etc. can be secured around the periphery of the second lens frame 110b, and the lens barrel 10 can be constructed to be small.

As shown in FIGS. 11 through 15, the input portions 116a and 116b project radially outwardly from the frame bodies 112a and 112b, respectively. In order to restrict the pivotal range of the first and second lens frames 110a and 110b, contact surfaces 68a, 69a; 68b, 69b extending radially inwardly are formed on the forward moving cylinder 52 in confrontation with each of side surfaces 118a, 119a; 118b, and 119b, of the first and second lens frames 110a and 110b. The input portion 116a of the first lens frame 110a has an internal gear 117a at the camera body side. The input portion 116b of the second lens frame 110b has an external gear 117b on the peripheral surface thereof. A driving gear 136 engages each of the internal gear 117a and the external gear 117b of each of the input portions 116a and 116b to drive the first and second lens frames 110a and 110b on each of the first and second supporting shafts 120a and 120b.

By the way, in the first embodiment, the driving motor for driving the first lens 14a is shown by a reference numeral 130A; on the other hand, the driving motor for driving the second lens 14b is shown by a reference numeral 130B.

As shown in FIGS. 14 and 15, the driving gear 136 is directly fixed to an output shaft 134 of a driving motor 130A (130B) in parallel with the optical axis and is driven without the intermediary of a reduction gear, the construction of which prevents a backlash, thus preventing a delay of rotational transmission thereto. The distance between the driving gear 136 and the optical axis is almost equal to the distance between the driving motor 130A (130B) and the optical axis.

The construction of supporting the first and second lens frames 110a and 110b is described below.

As shown in FIGS. 11 through 15, a torsion coil spring 124 and a washer 122 are mounted into the first and second supporting shafts 120a and 120b at the object-positioned side. The torsion coil spring 124 and the washer 122 are positioned adjacently to the shaft supporting portions 114a and 114b of each of the first and second lens frames 110a and 110b. The torsion coil spring 124 urges the first and second lens frames 110a and 110b toward the camera body side.

As shown in FIGS. 12 and 13, the torsion coil spring 124 comprises a cylindrical coil 124c and hooks 124a and 124b projecting radially outwardly from both ends of the coil 124c. The coil 124c is installed in a compressed state, thus urging the first and second lens frames 110a and 110b toward the camera body side, namely, toward the intermediate wall 60. Thus, the first and second lens frames 110a and 110b are prevented from being shaken in the direction of the optical axis. Accordingly, the movement of the first and second lenses 14a and 14b along the optical axis is surely prevented, thus preventing the object from being photographed out of its focus.

Also, as shown in FIGS. 12 and 13, the hook 124a and the hook 124b are installed in such a manner that the former is locked to the forward moving cylinder 52 and the latter is locked to the shaft supporting portions 114a and 114b of each of the first and second lens frames 110a and 110b. In this construction, the torsion coil spring 124 urges the first and second lens frames 110a and 110b clockwise, as shown by the arrows 128a and 128b in FIGS. 12 and 13. Therefore, irrespective of the rotational direction of the driving gear 136, the driving gear 136 contact the tooth surface of the internal gear 117a and that of the external gear 117b of each of the input portions 116a and 116b of each of the first and second lens frames 110a and 110b on the same side thereof. Accordingly, the delay in the transmission of rotation from the driving gear 136 to the internal gear 117a and the external gear 117b when the rotation of the driving gear 136 is reversed, can be effectively prevented. This is because no backlash occurs between the driving gear 136 and the internal gear 117a, and between the driving gear 136 and the external gear 117b.

The torsion coil spring 124 always urges the shaft supporting portions 114a and 114b of each of the first and second lens frames 110a and 110b with respect to each of the first and second supporting shafts 120a and 120b. Accordingly, the fluctuation in a direction of inclination of the first and second lens frames 110a and 110b relative to the first and second supporting shafts 120a and 120b , is effectively prevented.

As described above, the torsion coil spring 124 is used to prevent the first and second lens frames 110a and 110b installed on the first and second supporting shafts 120a and 120b from being shaken or fluctuated.

Next, the construction of installing the driving motor 130A (130B) is described below.

Figure 16:
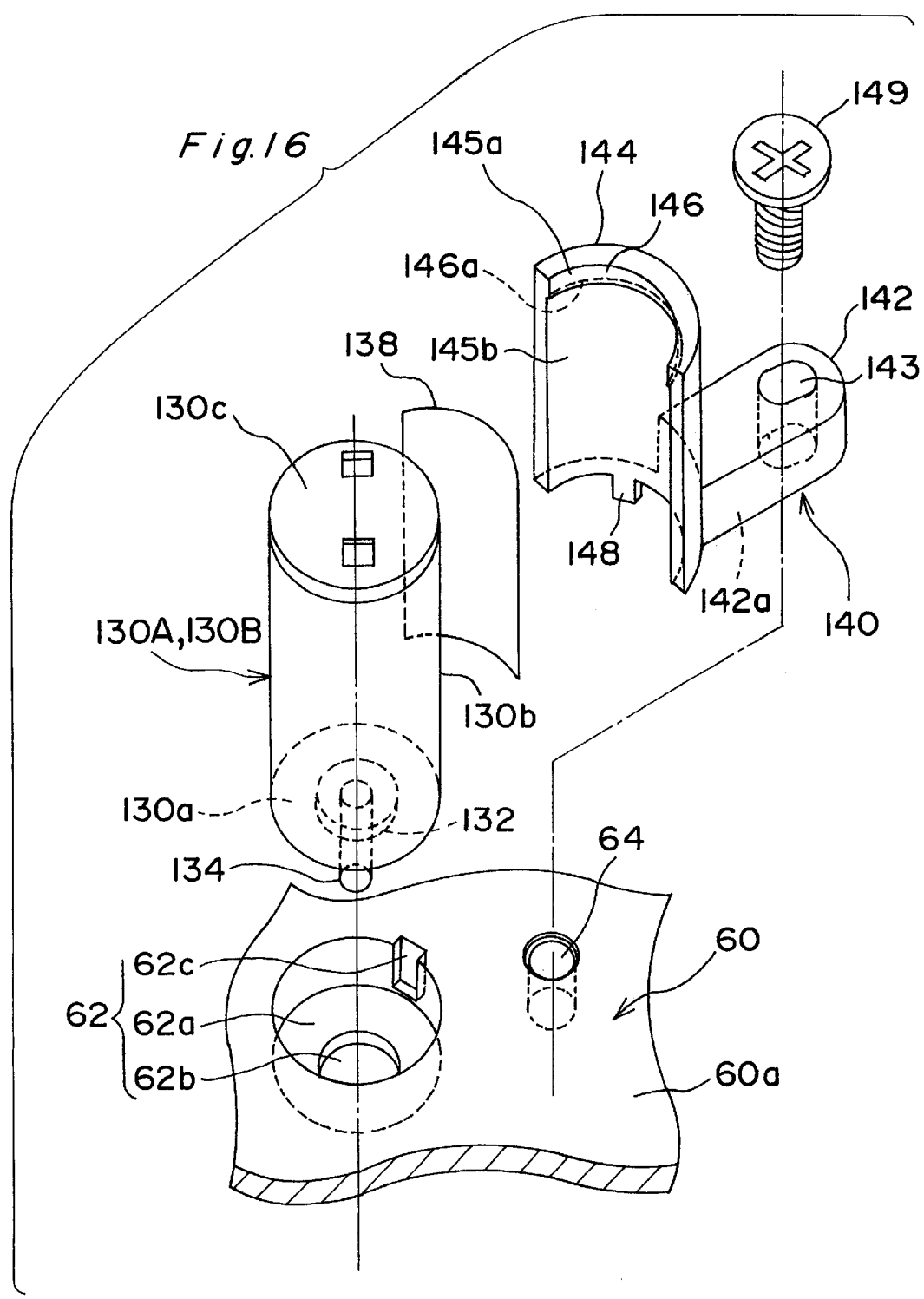
FIG. 16 is an exploded perspective view showing a mounting structure for a driving motor provided in the image shake preventing optical system of the lens barrel shown in FIG. 1.
Figure 17:
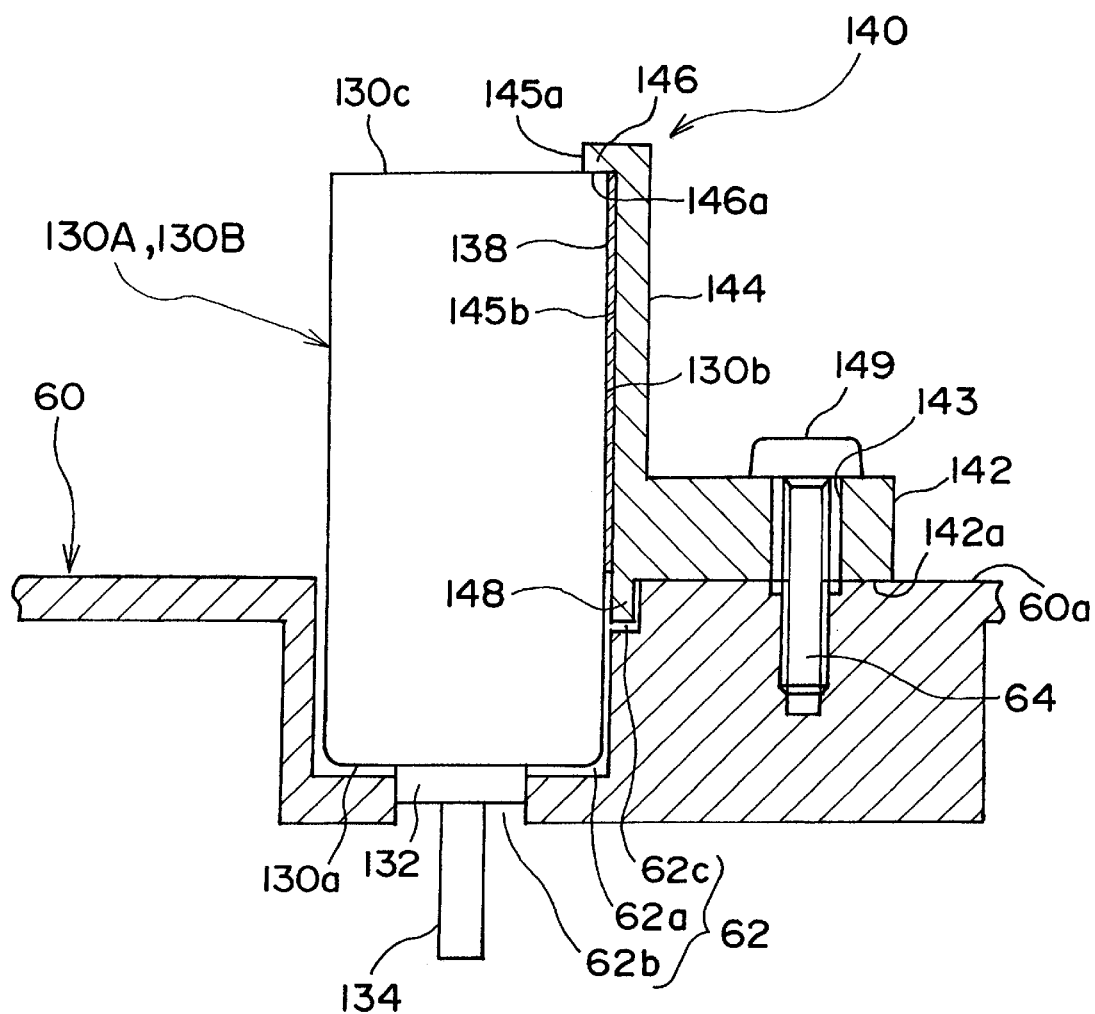
FIG. 17 is a sectional view showing an assembling of the mounting structure shown in FIG. 16.

A cylindrical DC motor is used as the driving motor 130A (130B) in the first embodiment. The outer diameter of the driving motor 130A (130B) is smaller than that of the conventional motor. A fixing screw hole is not formed on the front end surface 130a (see FIGS. 16 and 17) at the side of an output shaft 134. Thus, as shown in FIGS. 16 and 17, the driving motor 130A (130B) is first installed on a motor holder 140, and then the motor holder 140 on which the driving motor 130A (130B) has been installed is fixed to the intermediate wall 60 of the forward moving cylinder 52 of the lens barrel 10.

More specifically, the motor holder 140 comprises a motor installing wall 144 and a base 142 connected with each other in the shape of "L".

The motor installing wall 144 is semicircularly curved along the peripheral surface 130b of the driving motor 130A (130B). A lower inner peripheral surface 145b of the motor installing wall 144 has approximately the same radius of curvature as that of the peripheral surface 130b of the driving motor 130A (130B). An upper inner peripheral surface 145a of the motor installing wall 144 projects stepwise radially inwardly to form a positioning projection 146. A rotation stopping projection 148 projects in a direction of the motor shaft 134.

The base 142 projects radially outwardly from the lower part of the motor installing wall 144 and has an elongated hole 143 penetrating through the base 142 in the direction of the motor shaft 134. A lower surface 142a of the base 142 is perpendicular to the lower inner peripheral surface 145b of the motor installing wall 144.

A motor installing hole 62 is formed on the intermediate wall 60 of the forward moving cylinder 52. A motor insertion hole 62a and a positioning hole 62b are stepwise formed in the motor installing hole 62. The motor insertion hole 62a has a diameter a little greater than the outer diameter of the driving motor 130A (130B). The positioning hole 62b has an inner diameter almost equal to the outer diameter of the bearing 132 of the driving motor 130A (130B) and is coaxial with the motor insertion hole 62a. A cut-out groove 62c extends axially from the side of the motor insertion hole 62a. A screw hole 64 is formed on the intermediate wall 60 of the forward moving cylinder 52 at a position apart from the motor installing hole 62 with a certain distance therebetween.

The driving motor 130A (130B) is installed on the intermediate wall 60 of the forward moving cylinder 52 by using the motor holder 140 having the above-described construction, as described below.

Initially, the peripheral surface 130b of the driving motor 130A (130B) and the lower inner peripheral surface 145b of the motor installing wall 144 of the motor holder 140 are bonded to each other by using adhesive agent 138, for example, the double-coated adhesive tape 138. At this time, the rear end surface 130c of the driving motor 130A (130B) opposite to the output shaft 134 of the driving motor 130A (130B) contacts a shoulder 146a of the projection 146 of the motor installing wall 144 of the motor holder 140. In this manner, the driving motor 130A (130B) is fixed in position axially (i.e. in the direction of the motor shaft 134), with a condition in which the driving motor 130A (130B) is perpendicular to the lower surface 142a of the base 142 of the motor holder 140.

The variation in an interval between the lower inner peripheral surface 145b of the motor installing wall 144 and the peripheral surface 130b of the driving motor 130A (130B) can be absorbed to some extent by varying the thickness of the double-coated adhesive tape 138. Thus, even though the outer diameter of the driving motor 130A (130B) has a variation to some extent, the driving motor 130A (130B) can be firmly fixed to the motor holder 140. When the driving motor 130A (130B) has been fixed to the motor holder 140, the output shaft 134 and the bearing 132 of the driving motor 130A (130B) are positioned at levels lower than the lower surface 142a of the base 142 of the motor holder 140 in FIG. 17; namely, the output shaft 134 and the bearing 132 of the driving motor 130A (130B) project more to the side of the object to be photographed than the surface 142a of the base 142 of the motor holder 140.

Then, the motor holder 140 on which the driving motor 130A (130B) has been installed is fixed to the intermediate wall 60 of the forward moving cylinder 52. That is, the output shaft 134 is inserted into the motor installing hole 62 of the intermediate wall 60, and then a fixing screw 149 is inserted into the elongated hole 143 of the base 142 of the motor holder 140 and is engaged with the screw hole 64. As a result, the motor holder 140 is fixed to the intermediate wall 60. At this time, the rotation stopping projection 148 of the motor holder 140 is engaged by the cut-out groove 62c of the motor installing hole 62 to facilitate the positioning of the motor holder 140 and to prevent the motor holder 140 from being rotated in fixing the motor holder 140 to the intermediate wall 60 by the fixing screw 149. That is, a surface extending in the radial direction of the cut-out groove 62c of the motor installing hole 62 of the intermediate wall 60, namely, a rotation stopping surface, contacts a surface extending in the radial direction of the rotation stopping projection 148 of the motor holder 140, namely, a rotation stopping engaging surface, in order to facilitate the positioning of the motor holder 140 relative to the intermediate wall 60 and to prevent the rotation of the motor holder 140 relative thereto.

When the motor holder 140 is installed on the intermediate wall 60, the bearing 132 of the driving motor 130A (130B) engages the positioning hole 62b of the intermediate wall 60. Thus, the driving motor 130A (130B) is fixed in position relative to the intermediate wall 60. Because the bearing 132 of the driving motor 130A (130B) has a low degree of variations in size of the outer diameter thereof, the output shaft 134 of the driving motor 130A (130B) can be placed in position relative thereto accurately. Further, because the lower surface 142a of the base 142 of the motor holder 140 contacts the installing surface 60a of the intermediate wall 60, the driving motor 130A (130B) which is fixed to the motor holder 140 is supported at a right angle with the installing surface 60a of the intermediate wall 60.

That is, the position of the output shaft 134 of the driving motor 130A (130B) on the installing surface 60a is determined by the engagement between the bearing 132 of the driving motor 130A (130B) and the positioning hole 62b of the intermediate wall 60. Further, the inclination of the output shaft 134 of the driving motor 130A (130B) with respect to the installing surface 60a is determined by the verticalness between the lower inner peripheral surface 145b of the motor installing wall 144 of the motor holder 140 on which the driving motor 130A (130B) is installed and the lower surface 142a of the base 142.

The variation in the outer diameter of the driving motor 130A (130B) can be absorbed by the following construction: The inner diameter of the motor insertion hole 62a of the motor installing hole 62 is made to be a little greater than the outer diameter of the driving motor 130A (130B); a gap is provided between the rotation stopping projection 148 of the motor holder 140 and the cut-out groove 62c of the motor installing hole 62; and the elongated hole 143 is formed on the base 142 of the motor holder 140.

In the first embodiment, the driving motor 130A (130B) is installed on the installing surface 60a, in a direction perpendicular to the installing surface 60a, of the intermediate wall 60 which extends at a right angle with the optical axis.

Figure 18:
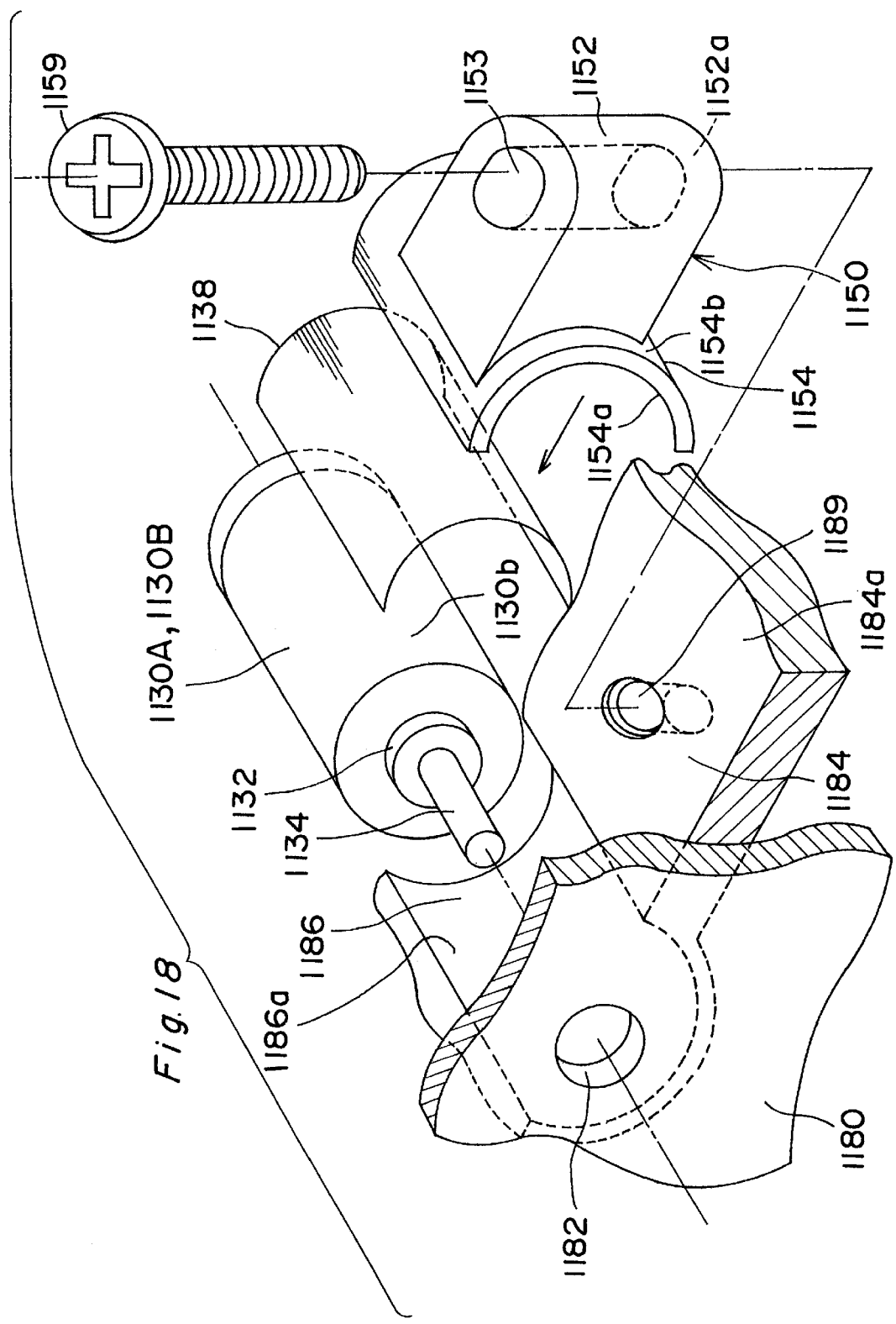
FIG. 18 is an exploded perspective view showing a mounting structure for a driving motor provided in an image shake preventing optical system of a lens barrel according to a second embodiment of the present invention.

Next, referring to FIGS. 18, 19 and 20, a full description is made on a mounting structure, for mounting a driving motor, which is used in a lens barrel with an image shake preventing optical system according to a second embodiment of the present invention.

The constructions of the second embodiment which are different from those of the first embodiment will be mainly described, and the constructions of the second embodiment which are similar to those of the first embodiment will be denoted by a plurality of reference numerals each of which is formulated by adding each reference numeral corresponding to each reference numeral in the first embodiment to a numerical order of one thousand.

In the second embodiment, a horizontal wall 1184 is provided at a right angle with a vertical wall 1180 corresponding to the intermediate wall 60 of the first embodiment, and the driving motor 1130A (1130B) is installed in parallel with the installing surface 1184a of the horizontal wall 1184 extending along the optical axis.

The motor holder 1150 comprises a motor install wall 1154 and a base 1152 which are connected with each other in a shape of an alphabetic letter "T".

The motor installing wall 1154 is semicircularly curved along the peripheral surface 1130b of the driving motor 1130A (1130B). An inner peripheral surface 1154b of the motor installing wall 1154 has approximately the same radius of curvature as that of the peripheral surface 1130b of the driving motor 1130A (1130B).

The base 1152 projects radially outwardly from the center of the peripheral surface 1154b of the motor installing wall 1154 and has an elongated hole 1153 which vertically penetrates through the base 1152. A surface extending in the circumferential direction of the base 1152, namely, a lower surface 1152a, and a center axis of the curved inner peripheral surface 1154a of the motor installing wall 1154 are included in the same plane.

The motor holder 1150 is installed at the intersection of the vertical wall 1180 and the horizontal wall 1184 which is perpendicular to vertical wall 1180. That is, a motor installing hole 1182 is formed on the vertical wall 1180. The motor installing hole 1182 has an inner diameter approximately equal to the outer diameter of the bearing 1132 of the driving motor 1130A (1130B). An installing surface 1184a of the horizontal wall 1184 on which the motor holder 1150 is installed is as tall as a center of the motor installing hole 1182 of the vertical wall 1180. The horizontal wall 1184 is curved downward in the vicinity of the motor installing hole 1182 to form a groove 1186. A screw hole 1189 is formed on the installing surface 1184a of the horizontal wall 1184.

Similar to the first embodiment, the peripheral surface 1130b of the driving motor 1130A (1130B) is bonded to I the inner peripheral surface 1154a of the motor installing wall 1154 of the motor holder 1150 by using a double-coated adhesive tape 1138, i.e. an adhesive tape which has adhesive on both sides thereof. Even though the outer diameter of the driving motor 1130A (1130B) has a variation which is caused by a tolerance for example, the driving motor 1130A (1130B) can be firmly fixed to the motor holder 1150, because the variation can be absorbed by varying the thickness of the double-coated adhesive tape 1138.

The bearing 1132 of the driving motor 1130A (1130B), the axis of the output shaft 1134, and the lower surface 1152a of the base 1152 are included in the same plane.

The motor holder 1150 on which the driving motor 1130A (1130B) is mounted is fixed to the installing surface 1184a of the horizontal wall 1184. That is, in order to fix the motor holder 1150 to the horizontal wall 1184, the output shaft 1134 of the driving motor 1130A (1130B) and the bearing 1132 thereof are inserted into the motor installing hole 1182 of the vertical wall 1180; a fixing screw 1159 is inserted into the elongated hole 1153 of the base 1152 of the motor holder 1150 to engage the fixing screw 1159 with the screw hole 1189 of the horizontal wall 1184; and the lower surface 1152a of the base 1152 of the motor holder 1150 and the installing surface 1184a of the horizontal wall 1184 are fixed to each other under pressure.

As shown in FIG. 19, the position of the driving motor 1130A (1130B) thus installed on the motor holder 1150 can be determined accurately in the direction of the vertical wall 1180 by the motor installing hole 182 of the vertical wall 1180. The inclination of the driving motor 1130A (1130B) with respect to the vertical wall 1180 is determined by the installing surface 1184a of the horizontal wall 1184. That is, as shown in FIG. 20, the axis of the driving motor 1130A (1130B) is included in a plane as tall as the installing surface 1184a of the horizontal wall 1184; the axis thereof is perpendicular to the vertical wall 1180 which is perpendicular to the horizontal wall 1184; and the axis thereof is parallel with the installing surface 1184a of the horizontal wall 1184.

Similar to the first embodiment, it is possible to form a positioning projection on the inner peripheral surface 1154a of the motor installing wall 1154 of the motor holder 1150, in order to place the driving motor 1130A (1130B) in position axially.

Next, referring to FIGS. 21 through 25, a full description is made on a mounting structure for mounting a lens barrel with an image shake preventing optical system according to a third embodiment of the present invention.

The constructions of the third embodiment which are different from those of the first embodiment will be mainly described, and the constructions of the third embodiment which are similar to those of the first embodiment will be denoted by a plurality of reference numerals each of which is formulated by adding each reference numeral corresponding to each reference numeral in the first embodiment to a numerical order of two thousand.

First, referring to FIGS. 21, 22, 23 and 25, it is explained mainly about a second lens frame 2110y.

As shown in the figures, a part of a cylindrical wall 2162 of a shaft supporting portion 2160 is cut out longitudinally (i.e. in a direction of axis of the shaft supporting portion) to be semicircular in cross section, and the part thereof have an opening 2163 which communicates its outside and a shaft hole 2161 thereof.

Opposed to the opening 2163, a pair of upper contact surfaces 2164a and 2164b extending axially and making about 120° therebetween is formed at the upper side of the cylindrical wall 2162. The bisector of each of the upper contact surfaces 2164a and 2164b passes through the center of the shaft hole 2161 of the shaft supporting portion 2160 and the center of the opening 2163.

Similarly, a pair of lower contact surfaces 2165a and 2165b are formed on the lower side of the inner peripheral surface of the cylindrical wall 2162. Spring-engaging projections 2166a and 2166b which project axially are formed at the upper and lower end surfaces of the cylindrical wall 2162 of the shaft supporting portion 2160, respectively.

Figure 21:
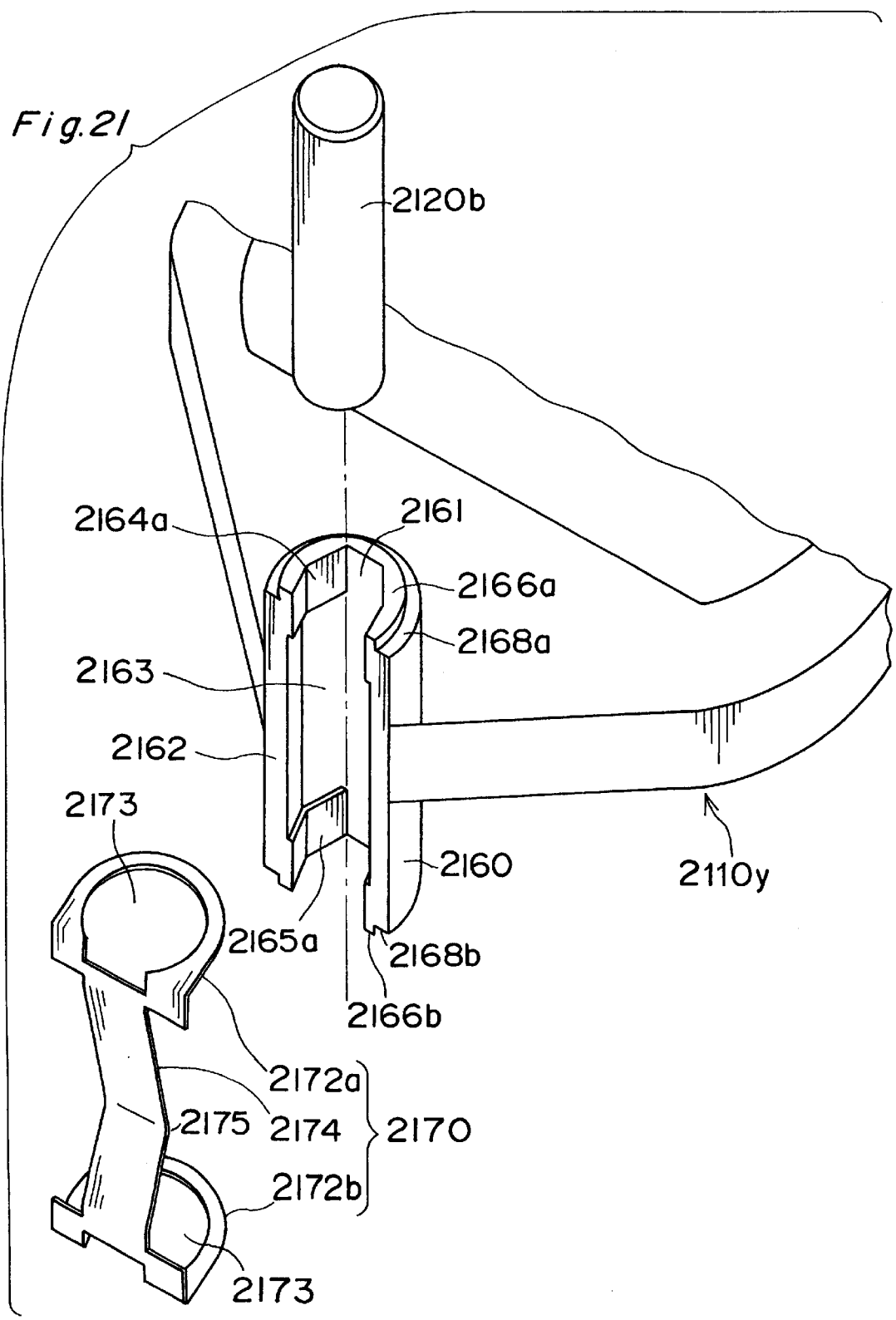
FIG. 21 is an exploded perspective view showing some main parts of a lens frame of an image shake preventing optical system of a lens barrel according to a third embodiment of the present invention.

A leaf spring 2170 is inserted into each of the spring-engaging projections 2166a and 2166b and engaged thereby. As shown in FIG. 21, the leaf spring 2170 consists of one plate-shaped member comprising a connection portion 2174 which is positioned at the center thereof, and engaging rings 2172a and 2172b which are positioned at both ends thereof and are bent generally perpendicular to the connection portion 2174.

The connection portion 2174 is curved in a shape of an alphabetic letter "V" in the same side as the bent side of the engaging rings 2172a and 2172b. The center portion 2175 projects in the greatest amount. An approximately circular opening 2173 is formed on the engaging rings 2172a and 2172b. The opening 2173 is installed around the periphery of the spring-engaging projections 2166a and 2166b of the shaft supporting portion 2160 of the second lens frames 2110y. The engaging rings 2172a and 2172b are parallel with each other, and the distance therebetween is equal to that between stepped surfaces 2168a and 2168b of the cylindrical wall 2162 of the shaft supporting portion 2160.

The second lens frames 2110y are installed on the supporting shaft 2120b, after the leaf spring 2170 is mounted on the spring-engaging projections 2166a and 2166b of the shaft supporting portion 2160.

That is, initially, the interval between the engaging rings 2172a and 2172b of the leaf spring 2170 is widened, and then the engaging rings 2172a and 2172b are mounted on each of the spring-engaging projections 2166a and 266b of the shaft supporting portion 2160 of the second lens frame 2110y. The inserted leaf spring 2170 is prevented from being removed from the spring-engaging projections 2166a and 2166b of the shaft supporting portion 2160 because the interval between the engaging rings 2172a and 2172b is likely to be returned to its original interval. In this state, the connection portion 2174 of the leaf spring 2170 confronts the opening 2163 of the shaft supporting portion 2160, and the center portion 2175 of the connection portion 2174 projects toward the shaft hole 2161 of the shaft supporting portion 2160.

Then, as shown in figures, the supporting shafts 2120a and 2120b are inserted into the shaft hole 2161 engaged by the leaf spring 2170; a coil spring 2178 is inserted on the supporting shafts 2120a and 2120b; and then the lens frames 2110x and 2110y are installed between the front wall 2066 of the forward moving cylinder 2052 and the intermediate wall 2060 thereof.

The center portion 2175 of the connection portion 2174 of the leaf spring 2170 installed on the spring-engaging projections 2166a and 2166b of the shaft supporting portion 2160, urges the supporting shafts 2120a and 2120b, and the engaging rings 2172a and 2172b pull the shaft supporting portion 2160 toward the supporting shafts 2120a and 2120b. Therefore, the upper and lower contact surfaces 2164a, 2164b, 2165a, and 2165b of the shaft supporting portion 2160 contact the supporting shafts 2120a and 2120b, respectively.

Figure 22:
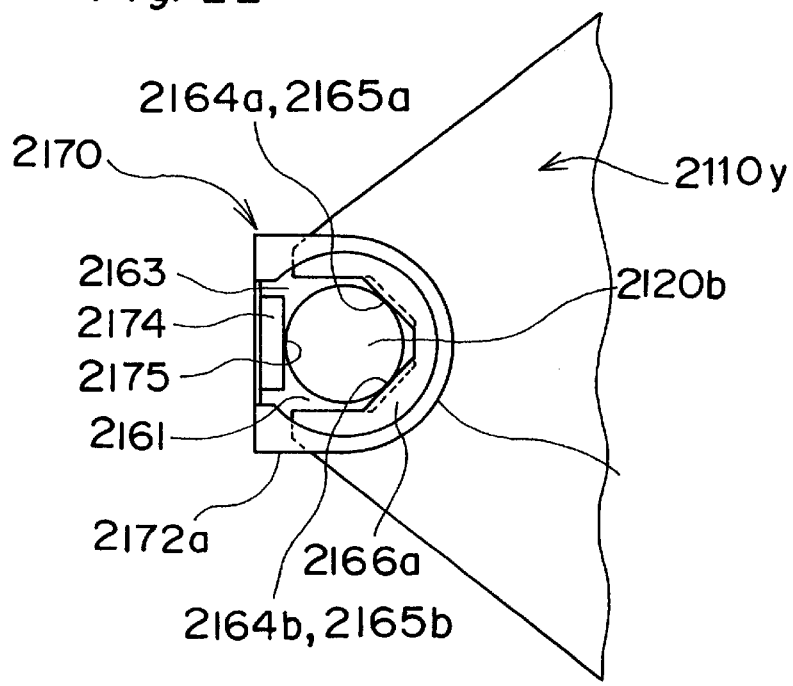
FIG. 22 is a plan view showing some parts of the lens frame, shown in FIG. 21, in assembling.
Figure 23:
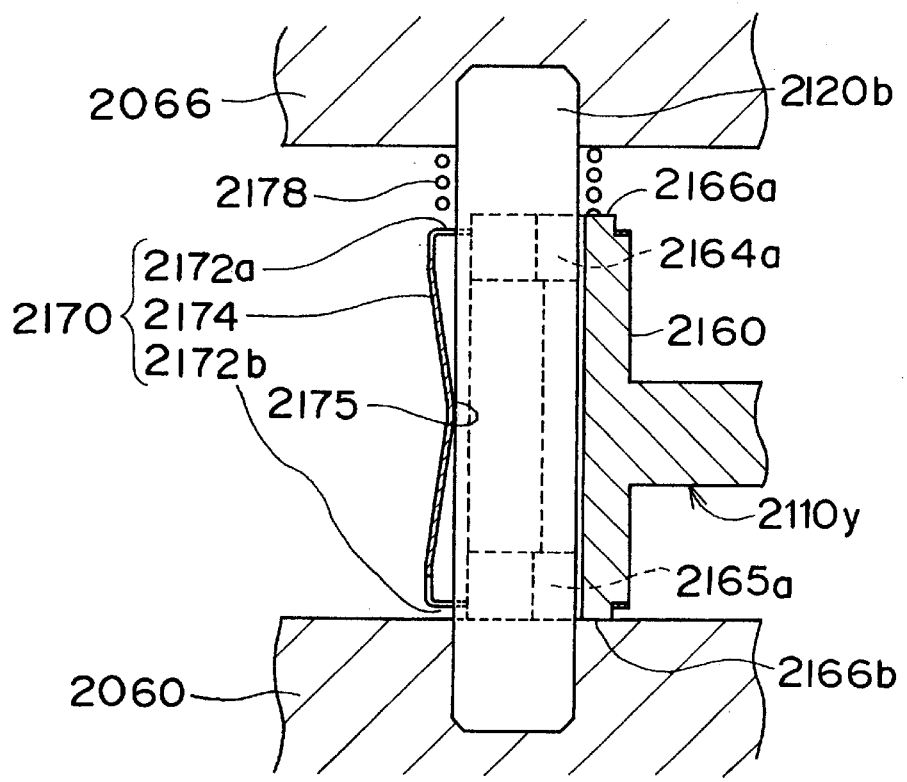
FIG. 23 is a sectional view showing some parts of the lens frame, shown in FIG. 21, in assembling.

As shown in FIG. 22, when the lens frame is viewed in the optical axis, the second lens frame 2110y, and the leaf spring 2170 contact the supporting shafts 2120a and 2120b at two points of the contact surfaces 2164a and 2165a of the shaft supporting portion 2160 or the contact surfaces 2164b and 2165b thereof and one point of the center portion 2175 of the connection portion 2174 of the leaf spring 2170, namely, at three points. More specifically, the lens frame 2110y and the leaf spring 2170 contact the supporting shafts 2120a and 2120b at five points, namely, at four points of the upper and lower contact surfaces 2164a, 2164b, 2165a, and 2165b of the shaft supporting portion 160 and one point of the center portion 2175 of the connection portion 2174 of the leaf spring 2170.

Accordingly, the second lens frame 2110y is supported by the supporting shafts 2120a and 2120b without being shaken.

Figure 24:
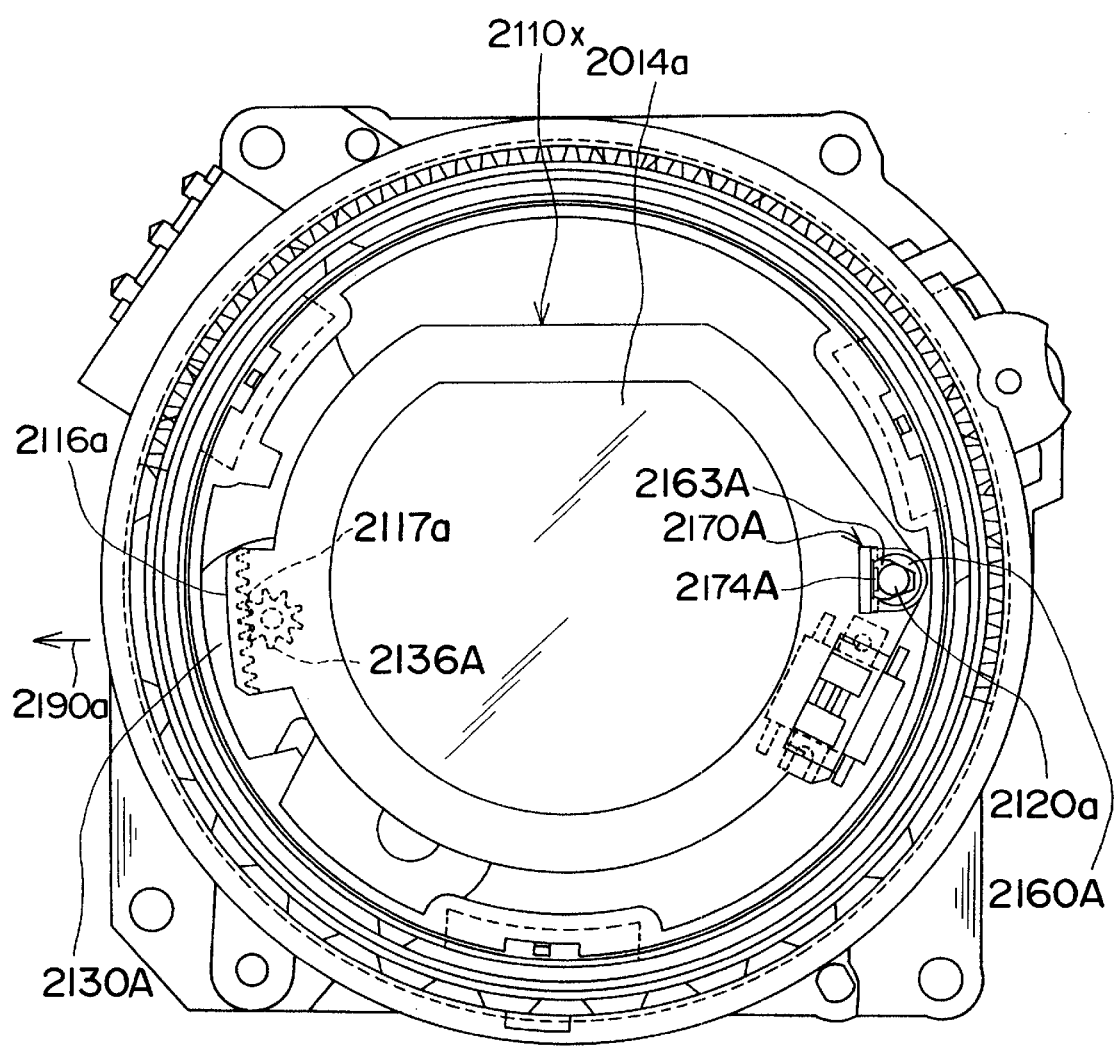
FIG. 24 is a plan view showing some main parts of a first lens of the image shake preventing optical system of the lens barrel shown in FIGS. 21, 22, and 23.

Meanwhile, the first lens frame 2110x, and its mounting structure have a fundamental construction which is similar to the second lens frame 2110y, and its mounting structure explained above. However, as shown in FIG. 24, the position of the opening 2163A of the shaft supporting portion 2160A of the first lens frame 2110x is positioned opposite to the position of the opening 2163 of the shaft supporting portion 2160 of the second lens frame 2110y. By the way, in FIG. 24, constructions or parts which are similar to those of the second lens frame 2110y and its mounting structure, are designated by adding a capital letter "A" to the corresponding reference numeral for the constructions or parts of the second lens frame 2110y and its mounting structure.

Figure 25:
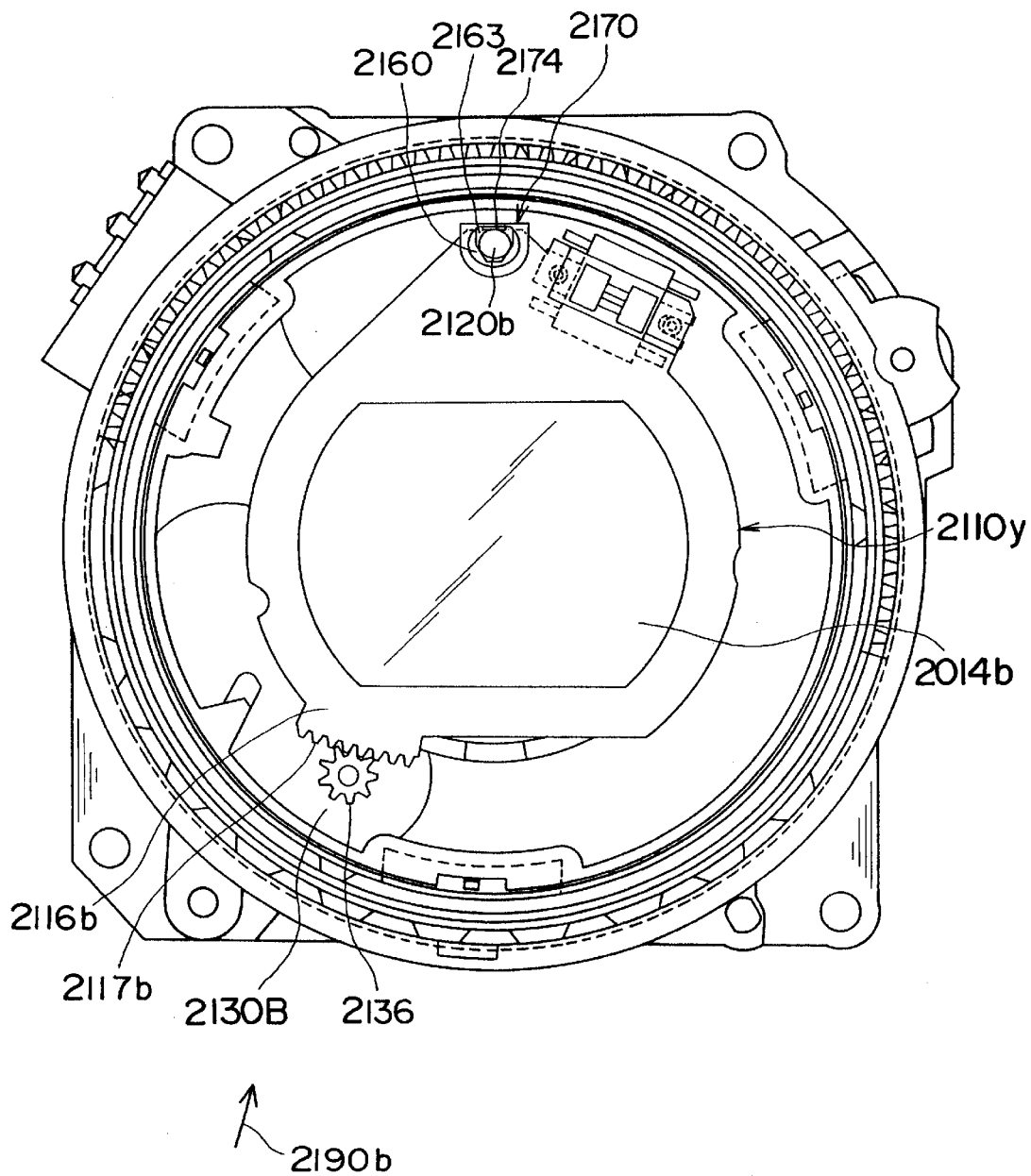
FIG. 25 is a plan view showing some main parts of a second lens of the image shake preventing optical system of the lens barrel shown in FIGS. 21, 22, and 23.

As mentioned above, the position of the opening 2163A of the shaft supporting portion 2160A of the first lens frame 2110x is positioned opposite to the position of the opening 2163 of the shaft supporting portion 2160 of the second lens frame 2110y; and regarding the second lens frame 2110y, as shown in FIG. 25, the opening 2163 of the shaft supporting portion 2160 is positioned on the side opposite to the side of the input portion 2116b, namely, on the side opposite to the optical axis.

The reason why the shaft supporting portion 2160A is reversely constructed relative to the shaft supporting portion 2160, as described above, is as follows. That is, it is because a force which is exerted upon the second lens frame 2110y by the engagement between the driving gear 2136 and the gear 2117b of the input portion 2116b is supported by the pair of upper contact surfaces 2164a and 2164b of the shaft supporting portion 2160, and by the pair of lower contact surfaces 2165a and 2165b thereof, regarding the second frame 2110y and its mounting structure; and it is because a force which is exerted upon the first lens frame 2110x by the engagement between the driving gear 2136A and the gear 2117a of the input portion 2116a is supported by the pair of upper contact surfaces, which correspond to those 2164a and 2164b, of the shaft supporting portion 2160A, and by the pair of lower contact surfaces, which correspond to those 2165a and 2165b, thereof, regarding the first frame 2110x and its mounting structure.

That is, as shown in FIG. 24, the first lens frame 2110x is supported by the supporting portion 2160A; at the same time, the internal gear 2117a of the input portion 2116a engages the driving gear 2136A. In the construction, a force shown by an arrow 2190a is exerted upon the first lens frame 2110x by the driving gear 2136A with respect to the supporting portion 2160A.

In the construction, in case that the opening of the cylindrical wall of the supporting portion 2160A is formed opposite to the optical axis as shown in FIG. 24, and in case that the force shown by an arrow 2190a is received by the leaf spring 2170 as shown in FIG. 21, the first lens frame 2110x will move in the direction shown by the arrow 2190a, unless the leaf spring 2170 has enough biasing force thereof against the force exerting in the direction shown by the arrow 2190a. As a result, the first lens 2014a will move in a direction generally perpendicular to the direction in which the first lens 2014a is controlled to move, so that it will be difficult to control and adjust the image forming positioning with the shake preventing optical system.

Meanwhile, as shown in FIG. 25, the second lens frame 2110y is supported by the supporting portion 2160; at the same time, the external gear 2117b of the input portion 2116b engages the driving gear 2136. In the construction, a force shown by an arrow 2190b is exerted upon the second lens frame 2110y by the driving gear 2136 with respect to the supporting portion 2160.

By the way, a reference numeral 2136A points to a driving gear which is directly fixed to an output shaft of a driving motor 2130A; on the other hand, a reference numeral 2136 points to a driving gear which is directly fixed to an output shaft of a driving motor 2130B.

In the construction, in case that the opening of the cylindrical wall of the supporting portion 2160 is formed on the side of the optical axis as shown in FIG. 24, and in case that the force shown by an arrow 2190b is received by the leaf spring 2170A as shown in the same figure, the second lens frame 2110y will move in the direction shown by the arrow 2190b, unless the leaf spring 2170A has enough biasing force thereof against the force exerting in the direction shown by the arrow 2190b. As a result, the second lens 2014b will move in a direction generally perpendicular to the direction in which the second lens 2014b is controlled to move, so that it will be difficult to control and adjust the image forming positioning.

Therefore, in order to prevent the aforementioned problem, the lens barrel with the image shake preventing optical system is so constructed that the force acting on the first and second lens frames 2110x and 2110y due to the engagement between the driving gear 2136A and the internal gear 2117a and due to the engagement between the driving gear 2136 and the external gear 2117b, is received by the pair of upper contact surfaces 2164a and 2164b, by the pair of the lower contact surfaces 2165a and 2165b of the shaft supporting portion 2160, and by the equivalent constructions of the shaft supporting portion 2160A.

With the constructions, the first and second lens frames 2110x and 2110y can be stably rotated without making the urging force of the leaf springs 2170 and 2170A great.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lens barrel comprising:

a first lens group;

a second lens group;

a first member which supports the first lens group inside the lens barrel;

a second member which supports the second lens group inside the lens barrel;

a first axis which is provided at a first position inside a periphery of the lens barrel and which rotatably supports the first member, wherein the first axis is parallel with an optical axis in a first plane that includes the optical axis;

a second axis which is provided at a second position, different from the first position, inside the periphery of the lens barrel and which rotatably supports the second member, wherein the second axis is parallel with the optical axis in a second plane, perpendicular to the first plane, that includes the optical axis;

a first drive mechanism which is provided inside the periphery of the lens barrel, wherein the first drive mechanism is provided opposite the first axis relative to the optical axis;

a second drive mechanism which is provided inside the periphery of the lens barrel, wherein the second drive mechanism is provided opposite the second axis relative to the optical axis;

a first input mechanism which is driven by the first drive mechanism so that the first lens group is rotated about the first axis via the first member; and a second input mechanism which is driven by the second drive mechanism so that the second lens group is rotated about the second axis via the second member.

2. The lens barrel as claimed in claim 1, wherein the first lens group and the second lens group constitute an afocal lens system.

3. The lens barrel as claimed in claim 1, wherein the first member and the first input member are constructed as a first lens supporting member, and wherein the second member and the second input member are constructed as a second lens supporting member.

4. The lens barrel as claimed in claim 1, wherein the first drive mechanism comprises a first drive motor which is provided in a direction parallel to the optical axis, wherein the second drive mechanism comprises a second drive motor which is provided in the direction parallel to the optical axis, wherein the first input mechanism comprises a first input gear, and wherein the first drive mechanism comprises a first drive gear that engages the first input gear in which the first drive gear is directly fixed to an output shaft of the first drive motor, wherein the second input mechanism comprises a second input gear, and wherein the second drive mechanism comprises a second drive gear that engages the second input gear in which the second drive gear is directly fixed to an output shaft of the second drive motor.

5. The lens barrel as claimed in claim 3, wherein the first and second lens groups are provided on a side of an object to be photographed with respect to a main photographic optical system inside the lens barrel, and wherein at least a part of the drive motor is provided near the main photographic optical system.

6. A lens barrel comprising:

a first lens for correcting an image-forming position;

a second lens for correcting the image-forming position;

a first lens supporting member which supports the first lens;

a second lens supporting member which supports the second lens;

a first drive pinion which is provided at a location around the first lens and which rotates the first lens supporting member; and a second drive pinion which is provided at a location around the second lens and which rotates the second lens supporting member, wherein the first lens supporting member comprises:

a first input gear which engages the first drive pinion, and a first supporting axis which rotatably supports the first lens supporting member in a first plane perpendicular to an optical axis, wherein the second lens supporting member comprises:

a second input gear which engages the second drive pinion, and a second supporting axis which rotatably supports the second lens supporting member in a second plane, perpendicular dicular to the first plane, perpendicular to the optical axis, and wherein one of the first input gear and the second input gear is an internal gear, and the other thereof is an external gear.

7. The lens barrel as claimed in claim 6, wherein the input gear provided on one having a largest effective light pass radius, of the first lens supporting member and the second lens supporting member is the internal gear.

8. The lens barrel as claimed in claim 6, wherein the input gear provided on one which is driven in a direction in which a short side of an aperture of the lens supporting member extends, of the first lens supporting member and the second lens supporting member, is the internal gear.

9. A lens barrel comprising:

a first supporting axis which is provided at a position inside a periphery of the lens barrel, wherein the first supporting axis is parallel to an optical axis thereof;

a second supporting axis which is provided at a position inside the periphery of the lens barrel, wherein the second supporting axis is parallel to the optical axis thereof;

a first lens supporting member which holds a first lens for correcting an image-forming position, is rotatably supported by the first supporting axis with the first lens supporting member being perpendicular to the first supporting axis, and has a first engaging input part;

a second lens supporting member which holds a second lens for correcting the image-forming position, is rotatably supported by the second supporting axis with the second lens supporting member being perpendicular to the second supporting axis, and has a second engaging input part;

a first engaging drive part which engages the first engaging input part so that the first lens supporting member is rotated about the first supporting axis;

a second engaging drive part which engages the second engaging input part so that the second lens supporting member is rotated about the second supporting axis;

a first rotation biasing member which is provided on the first supporting axis, and which biases the first lens supporting member in a predetermined rotational direction; and a second rotation biasing member which is provided on the second supporting axis, and which biases the second lens supporting member in a predetermined rotational direction.

10. The lens barrel as claimed in claim 9, which further comprises:

a first axial biasing member which is provided on the first supporting axis, and which biases the first lens supporting member in a direction of the optical axis, so that the first lens supporting member is contacted with a stopper that is provided on a predetermined position of a body of the lens barrel; and a second axial biasing member which is provided on the second supporting axis, and which biases the second lens supporting member in the direction of the optical axis, so that the second lens supporting member is contacted with a stopper that is provided on a predetermined position of the body of the lens barrel.

11. The lens barrel as claimed in claim 10, wherein the rotation biasing member and the axial biasing member are comprised of a torsion spring, wherein the torsion spring has a coil part that is cylindrical in shape and is able to be compressed, and has a pair of hooks that project radially outwardly from both ends thereof, wherein the coil part of the torsion spring is engaged around the supporting axis with the coil part thereof being compressed, so that the lens supporting member is biased in the direction of the optical axis, and so that the lens supporting member is contacted with the stopper, wherein one of the pair of hooks of the torsion spring with a strain energy being stored therein engages the lens supporting member, and the other of the pair thereof engages the body of the lens barrel, so as to bias the lens supporting member in the rotational direction relative to the body of the lens barrel.

12. A lens barrel comprising:

at least two lens groups; and at least two lens-supporting members for holding the at least two lens groups, wherein each of the lens-supporting members is rotationally supported by a different point inside a periphery of the lens barrel in which each of the lens-supporting members rotates in a different plane which is perpendicular to an optical axis of the lens barrel, and wherein the lens supporting member, having the lens group which has a smallest luminous flux range, of the at least two lens-supporting members, is rotated to move along a direction in which a long side of a luminous flux range extends.

13. The lens barrel as claimed in claim 12, wherein the at least two lens group constitute an afocal lens system.

14. The lens barrel as claimed in claim 12, wherein at least one of the lens groups, and at least one lens frame of the lens-supporting member for the at least one of the lens groups, have a round profile which is perpendicular to the optical axis, wherein a part of the profile thereof is formed as a cord at a predetermined location, and wherein the profile of the at least one of the lens groups, and the profile of the at least one lens frame thereof, correspond to each other.

15. The lens barrel as claimed in claim 14, wherein the cord of the profile is formed along the long long axis of symmetry of said at least one lens.

16. A lens barrel comprising:

a first lens group;

a second lens group;

a first member which supports the first lens group inside the lens barrel;

a second member which supports the second lens group inside the lens barrel;

a first axis which is provided at a first position inside a periphery of the lens barrel and which rotatably supports the first member;

a second axis which is provided at a second position, different from the first position, inside the periphery of the lens barrel and which rotatably supports the second member;

a first drive mechanism which is provided inside the periphery of the lens barrel, wherein the first drive mechanism is provided opposite the first axis relative to the optical axis;

a second drive mechanism which is provided inside the periphery of the lens barrel, wherein the second drive mechanism is provided opposite the second axis relative to the optical axis;

a first input mechanism which is driven by the first drive mechanism so that the first lens group is rotated about the first axis via the first member; and a second input mechanism which is derived by the second drive mechanism so that the second lens group is rotated about the second axis via the second member.

17. A lens barrel comprising:

a first lens for correcting an image-forming position;

a second lens for correcting the image-forming position;

a first lens supporting member which supports the first lens;

a second lens supporting member which supports the second lens;

a first driving mechanism which is provided at a location around the first lens and which rotates the first lens supporting member; and a second driving mechanism which is provided at a location around the second lens and which rotates the second lens supporting member, wherein the first lens supporting member comprises:

a first driven member which is driven by the first driving mechanism; and a first supporting axis which rotatably supports the first lens supporting member in a first plane perpendicular to an optical axis, wherein the second lens supporting member comprises:

a second driven member which is driven by the second driving mechanism, and a second supporting axis which rotatably supports the second lens supporting member in a second plane, perpendicular to the first plane, perpendicular to the optical axis, and wherein one of the first driven member and the second driven member is provided radially outwardly relative to one of the first driving mechanism and the second driving mechanism, and the other of the first driven member and the second driven member is provided radially inwardly relative to the other of the first driving mechanism and the second driving mechanism.

18. A lens barrel comprising:

a supporting axis which is provided at a position inside a periphery of the lens barrel, wherein the supporting axis is parallel to an optical axis thereof;

a lens supporting member which holds a lens for correcting an image-forming position, is rotatably supported by the supporting axis with the lens supporting member being perpendicular to the supporting axis, and has an engaging input part;

an engaging drive part which engages the engaging input part so that the lens supporting member is rotated about the supporting axis; and a rotation biasing member which is provided on the supporting axis, and which biases the lens supporting member in a rotational direction.

* * * * *